US 10,858,188 B2

United States Patent
Fujihara et al.

(10) Patent No.: US 10,858,188 B2
(45) Date of Patent: Dec. 8, 2020

(54) GRIPPING DEVICE AND CONVEYING APPARATUS

(71) Applicants: KABUSHIKI KAISHA TOSHIBA, Tokyo (JP); TOSHIBA INFRASTRUCTURE SYSTEMS & SOLUTIONS CORPORATION, Kanagawa (JP)

(72) Inventors: Hiroaki Fujihara, Kawasaki Kanagawa (JP); Naruaki Hiramitsu, Kawasaki Kanagawa (JP)

(73) Assignees: KABUSHIKI KAISHA TOSHIBA, Tokyo (JP); TOSHIBA INFRASTRUCTURE SYSTEMS & SOLUTIONS CORP., Kanagawa (JP)

( * ) Notice: Subject to any disclaimer, the term of this patent is extended or adjusted under 35 U.S.C. 154(b) by 193 days.

(21) Appl. No.: 16/105,753

(22) Filed: Aug. 20, 2018

(65) Prior Publication Data
US 2019/0084762 A1   Mar. 21, 2019

(30) Foreign Application Priority Data

Sep. 15, 2017   (JP) ................................. 2017-178032

(51) Int. Cl.
| G06F 7/00 | (2006.01) |
| B65G 1/137 | (2006.01) |
| B25J 15/00 | (2006.01) |
| B25J 15/10 | (2006.01) |

(Continued)

(52) U.S. Cl.
CPC ........ *B65G 1/1373* (2013.01); *B25J 15/0009* (2013.01); *B25J 15/0061* (2013.01); *B25J 15/0616* (2013.01); *B25J 15/103* (2013.01); *G05B 19/4182* (2013.01);
(Continued)

(58) Field of Classification Search
None
See application file for complete search history.

(56) References Cited

U.S. PATENT DOCUMENTS

| 4,723,353 A | 2/1988 | Monforte |
| 5,501,498 A | 3/1996 | Ulrich |
| 8,132,835 B2 | 3/2012 | Ban et al. |

(Continued)

FOREIGN PATENT DOCUMENTS

| JP | H03152091 A | 6/1991 |
| JP | H08318488 A | 12/1996 |

(Continued)

OTHER PUBLICATIONS

Russian Office Action dated Apr. 3, 2019, mailed in counterpart Russian Application No. 2018132633, 16 pages (with translation).

*Primary Examiner* — Yolanda R Cumbess
(74) *Attorney, Agent, or Firm* — Kim & Stewart LLP

(57) ABSTRACT

A conveying apparatus includes: an article detection device; a gripping device with base portion and palm portion, a suction portion, fingers, and a driving mechanism; a negative pressure supplying device; a moving device; a recognition device that measures the shape, the posture, and the size of the article; an operation plan generation device that selects a suction surface of the article, and plans a gripping posture; and a control device that controls an operation of the gripping device and an operation of the moving device to obtain a gripping posture planned by the operation plan generation device.

18 Claims, 18 Drawing Sheets

(51) Int. Cl.
*B25J 15/06* (2006.01)
*G05B 19/418* (2006.01)

(52) U.S. Cl.
CPC .............. *G05B 2219/39102* (2013.01); *G05B 2219/39476* (2013.01); *G05B 2219/45054* (2013.01)

(56) References Cited

U.S. PATENT DOCUMENTS

| | | | |
|---|---|---|---|
| 9,102,059 B2 * | 8/2015 | Nammoto | .............. B25J 9/1612 |
| 9,486,926 B2 * | 11/2016 | Kawano | .................. B65G 43/08 |
| 2010/0078953 A1 | 4/2010 | Ban et al. | |
| 2015/0032252 A1 | 1/2015 | Galluzzo et al. | |

FOREIGN PATENT DOCUMENTS

| | | |
|---|---|---|
| JP | 2001205584 A | 7/2001 |
| JP | 2010005736 A | 1/2010 |
| JP | 2010110846 A | 5/2010 |
| JP | 4708464 B2 | 6/2011 |
| JP | 2014144526 A | 8/2014 |
| SU | 1137069 A1 | 1/1985 |
| WO | 2013126048 A1 | 8/2013 |

* cited by examiner

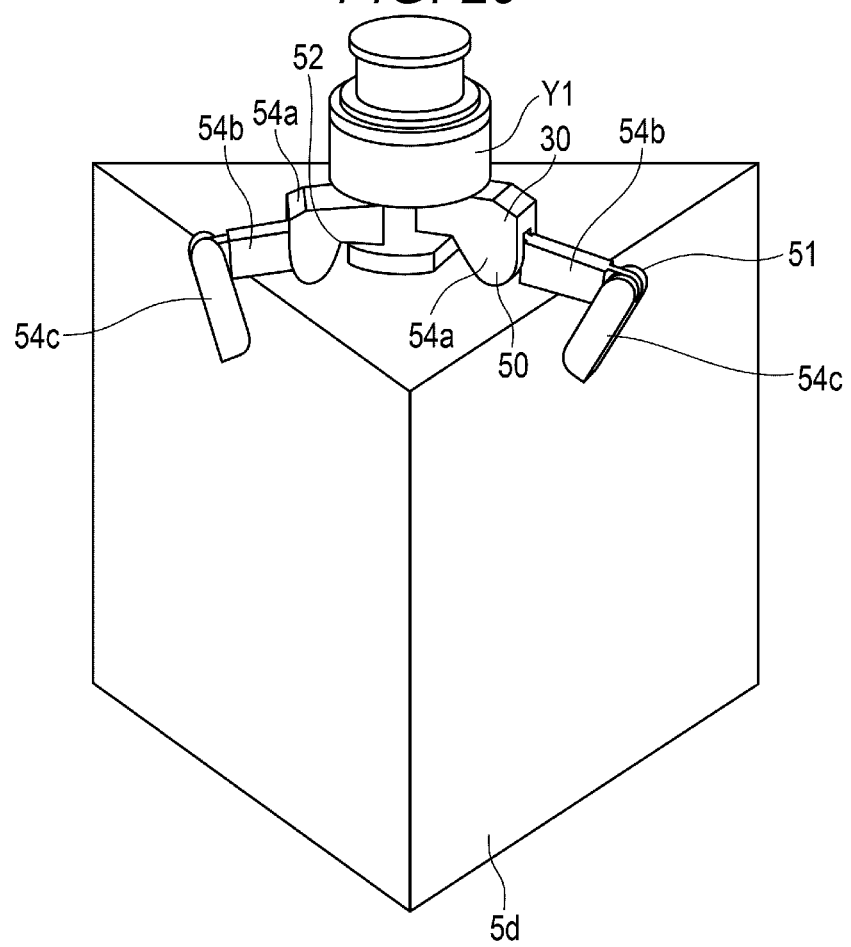

GRIPPING DEVICE AND CONVEYING APPARATUS

CROSS-REFERENCE TO RELATED APPLICATIONS

This application is based upon and claims the benefit of priority from Japanese Patent Application No. 2017-178032, filed Sep. 15, 2017, the entire contents of which are incorporated herein by reference.

FIELD

Embodiments described herein relate generally to a gripping device for gripping an article and a conveying apparatus including a gripping device.

BACKGROUND

In logistics warehouse and the like, an apparatus for moving articles, such as items of merchandise, to a destination, such as a shelf or a conveyor belt, can be used. An apparatus such as a robot arm attached to a gripping device such as a multi-fingered gripping device or a suction holding device has been used for the moving of various articles.

DESCRIPTION OF THE DRAWINGS

FIG. 29 is a perspective view showing a state where the gripping device of an embodiment grips another article in a gripping posture in a fourth gripping mode.

DETAILED DESCRIPTION

Embodiments provide a gripping device that can grip an article regardless of shape and posture of the article, and a conveying apparatus including the gripping device.

In general, according to an embodiment, a conveying apparatus comprises: an article detection device to detect an article and provide information related to shape, posture, and size of the article; a gripping device that includes: a base portion having a palm portion, a suction portion on the palm portion, a first finger on a first side of the palm portion, a second finger on a second side of the palm portion with the palm portion being between the first and second fingers, each of the first and second fingers having a joint and being moveable toward and away from each other, and a driving mechanism which moves the first and second fingers toward and away from each other; a negative pressure supply device to supply a negative pressure to the suction portion; a moving device to move the gripping device; a recognition device that measures a shape, a posture, and a size of the article based on information from the article detection device; an operation plan generator device configured to select a suction surface on the article to be suctioned by the suction portion, and set a gripping posture for the gripping device based on measurements by the recognition device, the gripping posture including a posture of the first and second fingers; and a control device configured to control the gripping device and the moving device so as to obtain the gripping posture set by the operation plan generation device.

A conveying apparatus 10 according to certain example embodiments will be described with reference to FIGS. 1 to 29.

Figure 1:
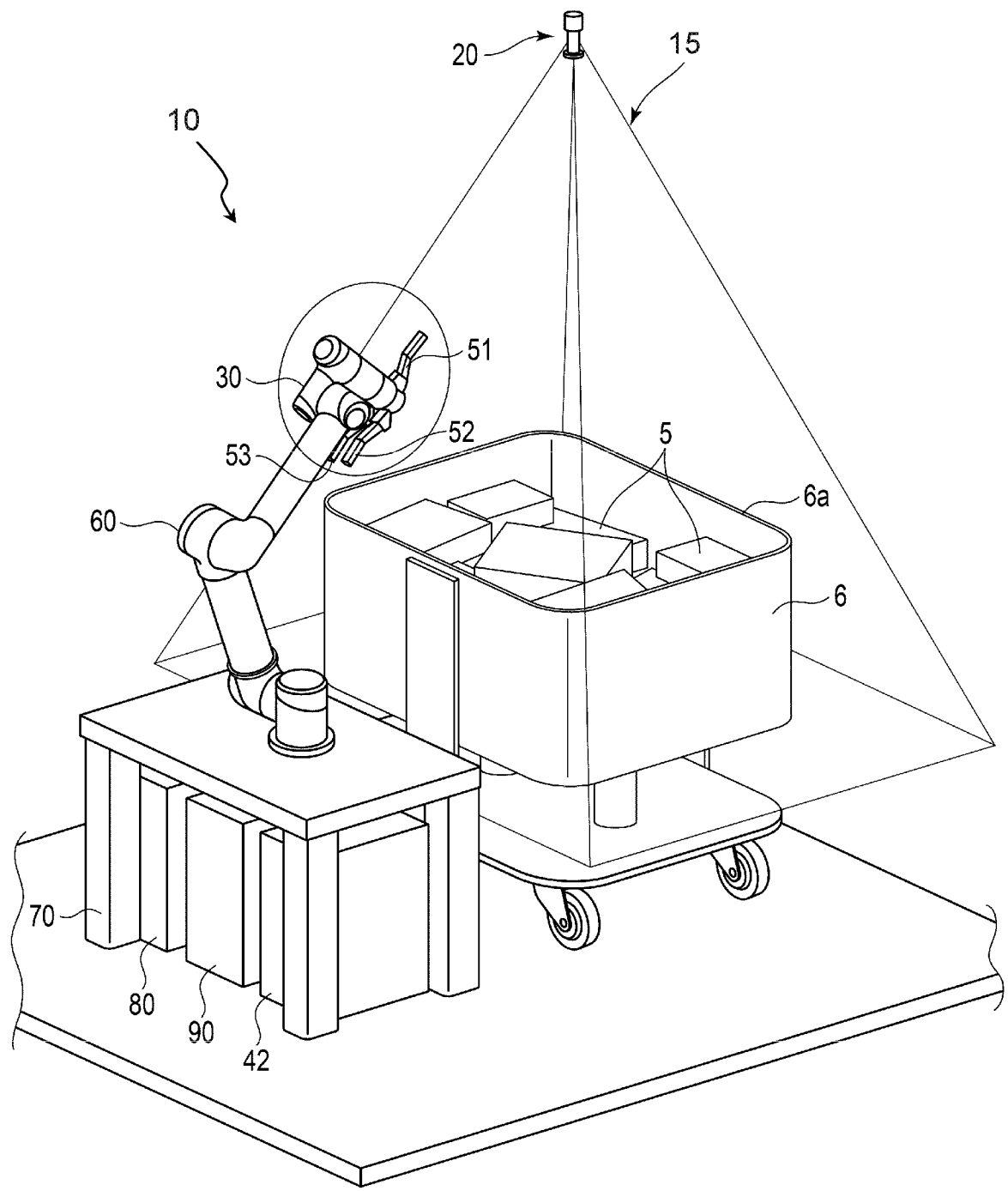
FIG. 1 is a perspective view showing a conveying apparatus according to an embodiment.
Figure 2:
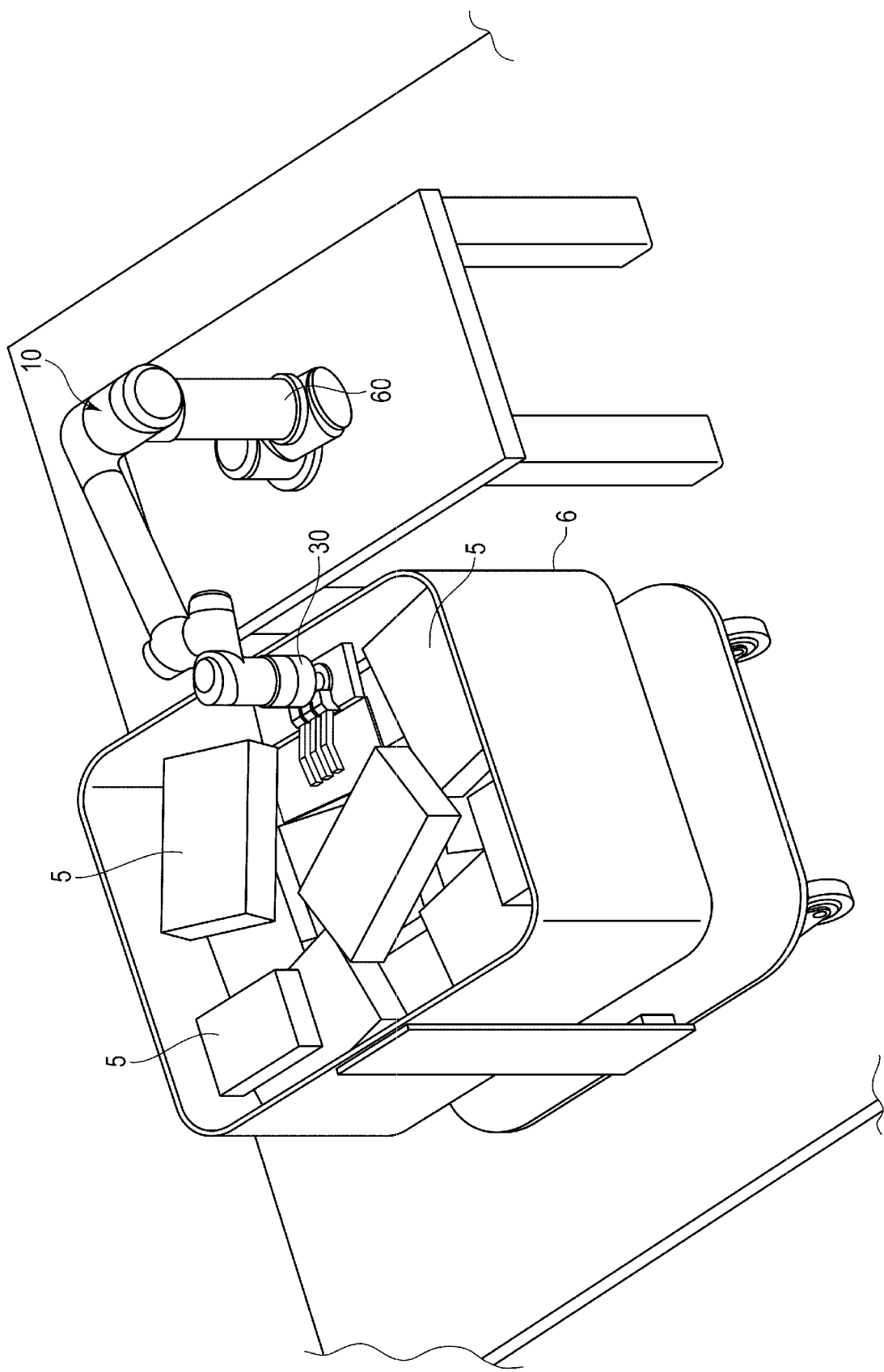
FIG. 2 is a perspective view showing the conveying apparatus of an embodiment.
Figure 3:
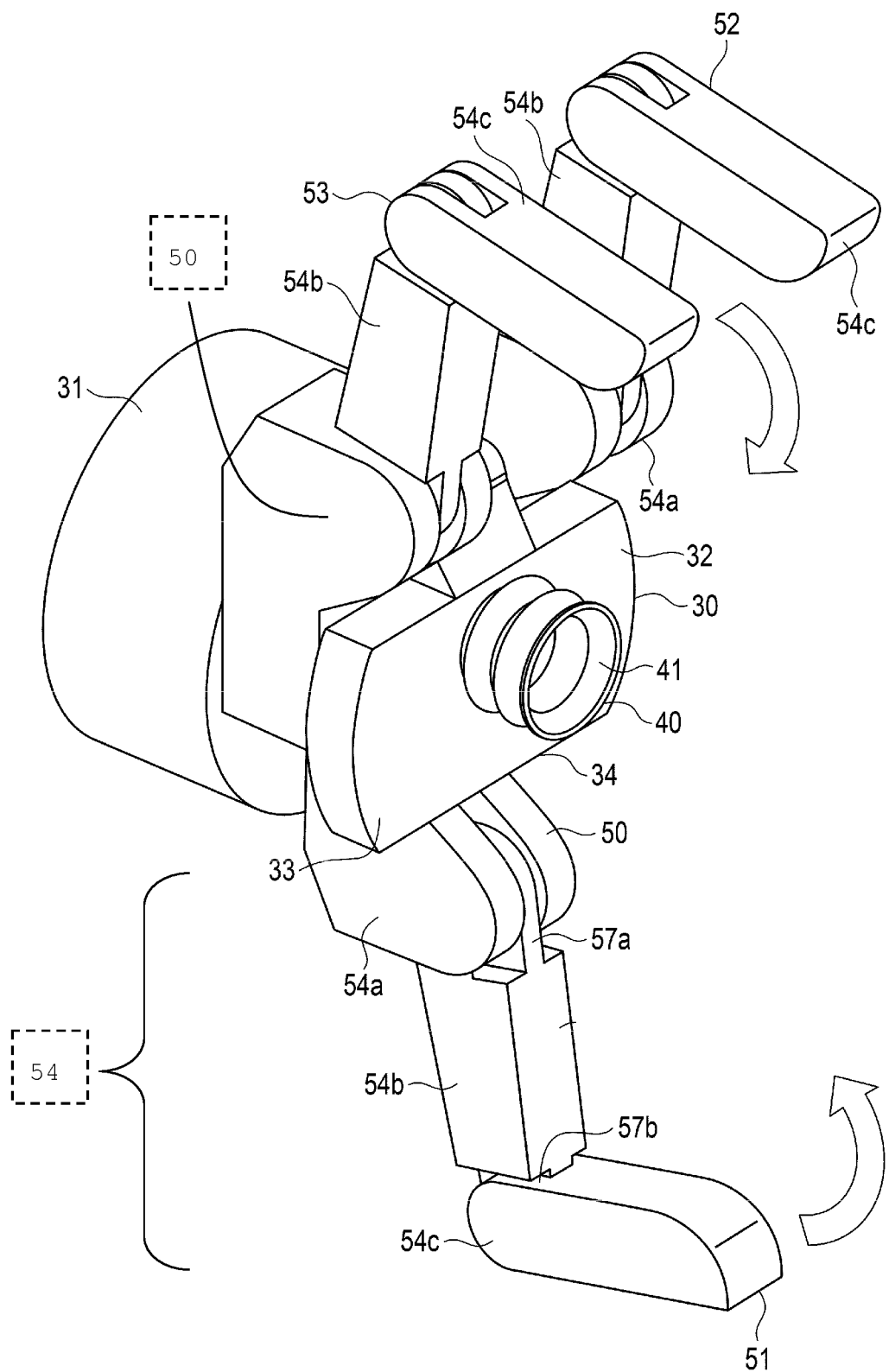
FIG. 3 is a perspective view showing a gripping device used in the conveying apparatus of an embodiment.
Figure 4:
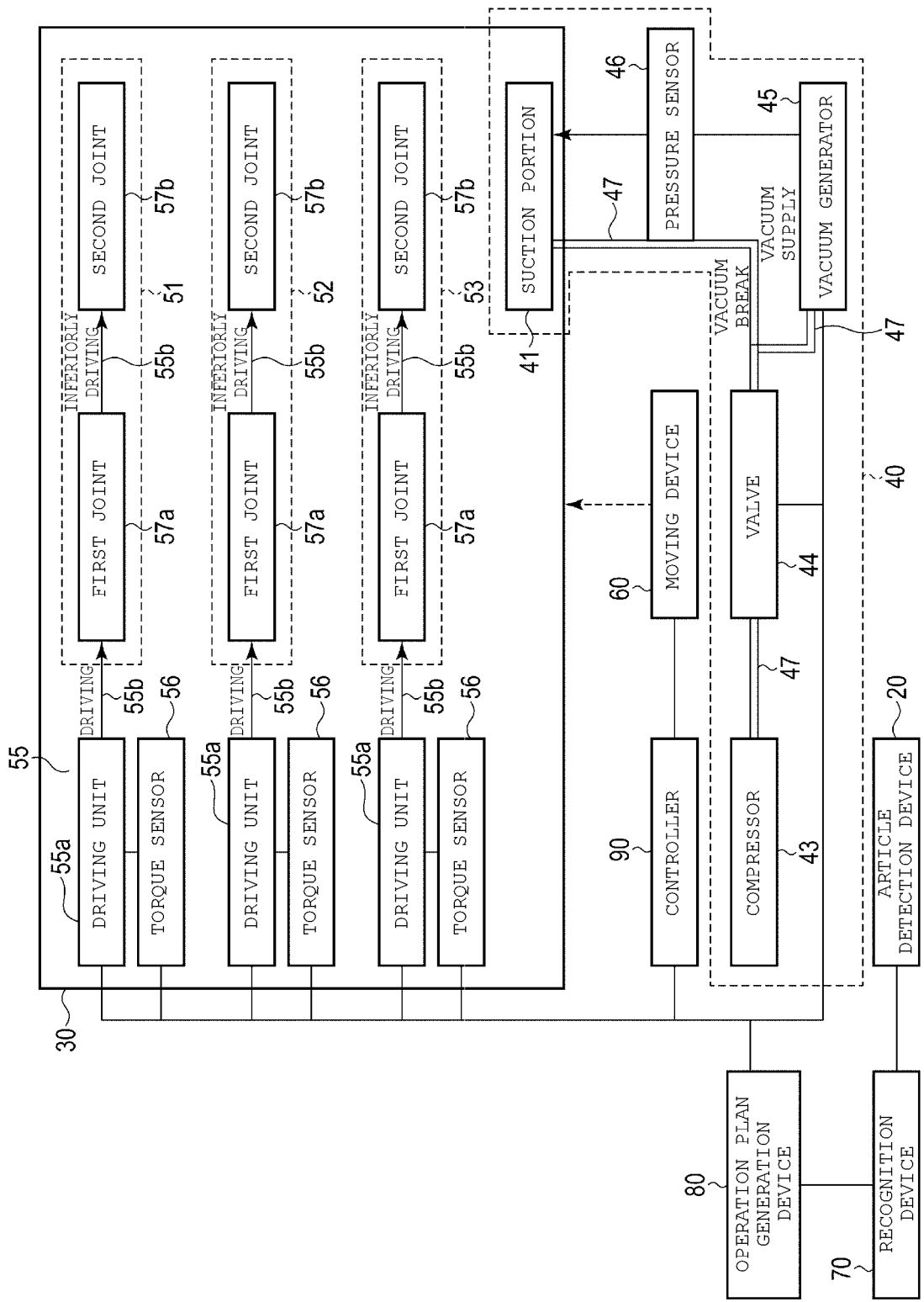
FIG. 4 is a block diagram showing a configuration of the conveying apparatus according to an embodiment.

FIG. 1 is a perspective view showing a conveying apparatus 10. FIG. 2 is a perspective view showing a conveying apparatus 10. FIG. 2 shows a state where the conveying apparatus 10 is viewed from an angle different from that in FIG. 1. FIG. 3 is a perspective view showing a gripping device 30 used in the conveying apparatus 10. FIG. 4 is a block diagram showing a configuration of the conveying apparatus 10.

Figure 5:
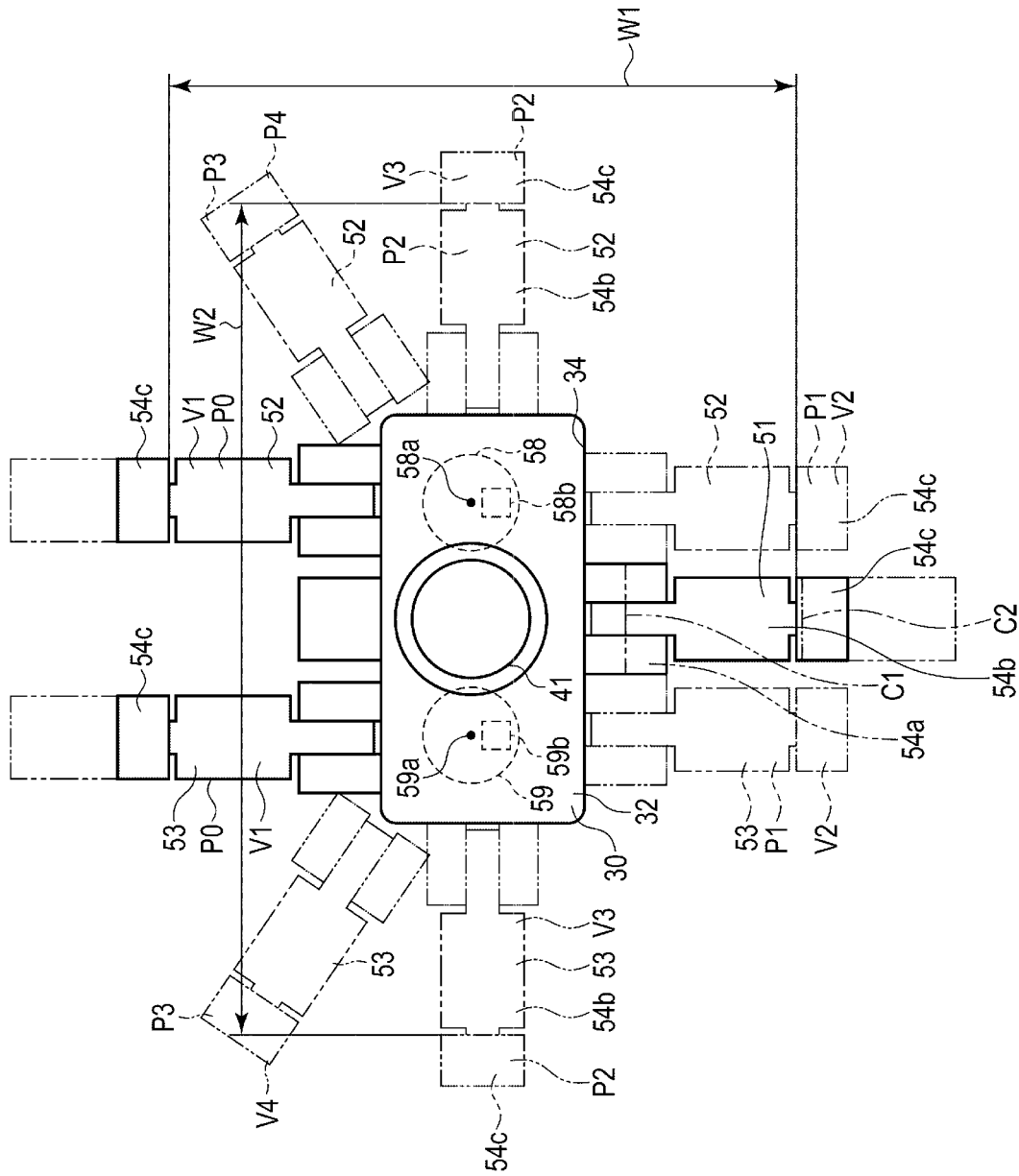
FIG. 5 is a front view showing the gripping device used in the conveying apparatus of an embodiment.
Figure 6:
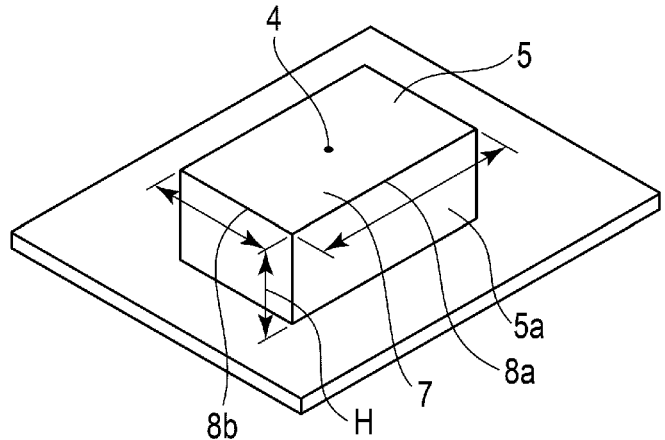
FIGS. 6-11 are perspective views showing variously shaped articles.
Figure 7:
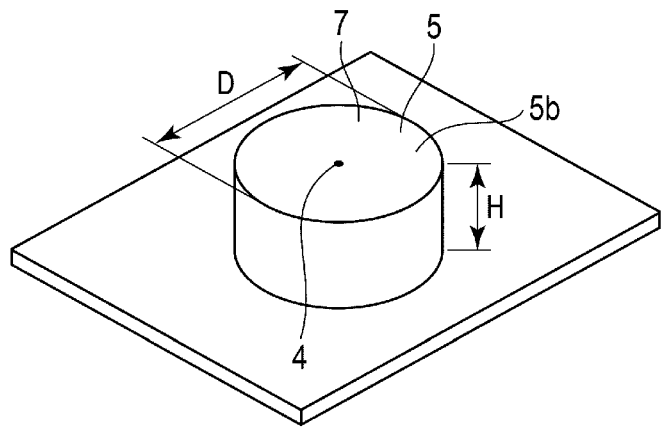
Figure 8:
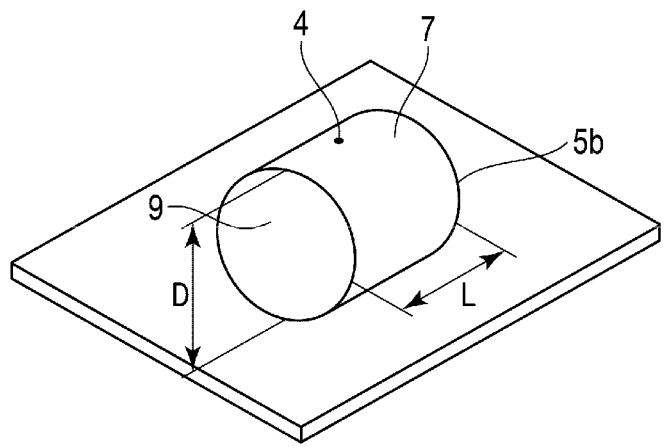
Figure 9:
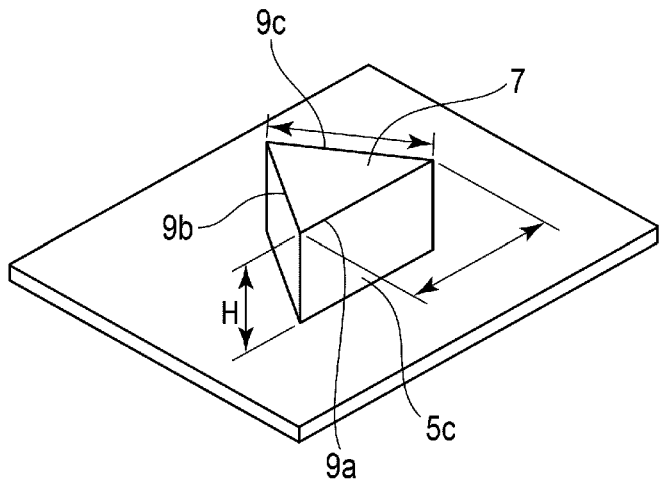
Figure 10:
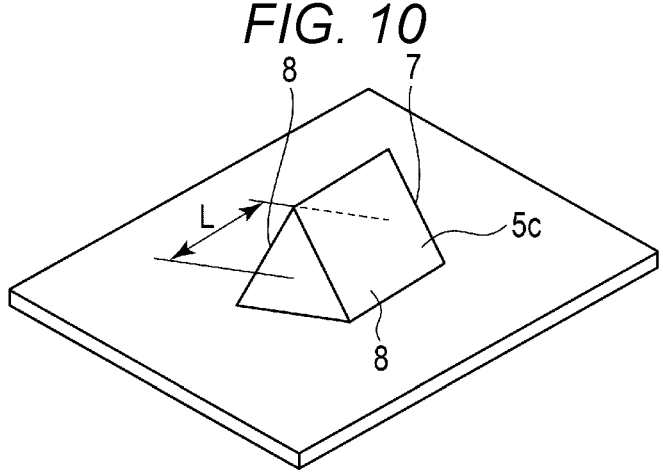
Figure 11:
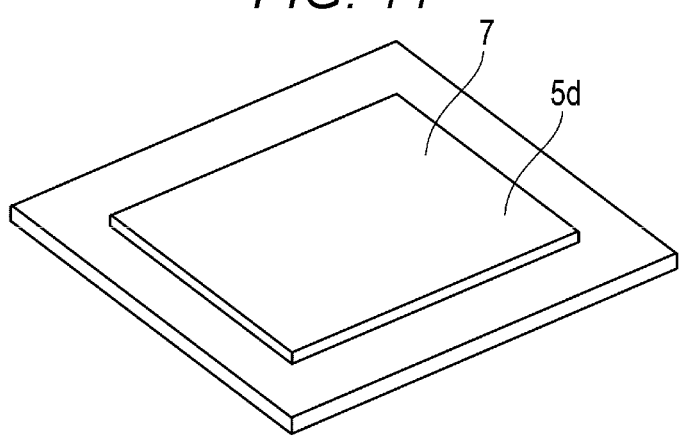

FIG. 5 is a front view showing the gripping device 30. FIG. 6 is a perspective view showing an article 5*a*. FIG. 7 is a perspective view showing another article 5*b*. FIG. 8 is a perspective view showing another article 5*c*. FIG. 9 is a perspective view showing another article 5*c*. FIG. 10 is a perspective view showing another article 5*c*. FIG. 11 is a perspective view showing another article 5*d*.

Figure 12:
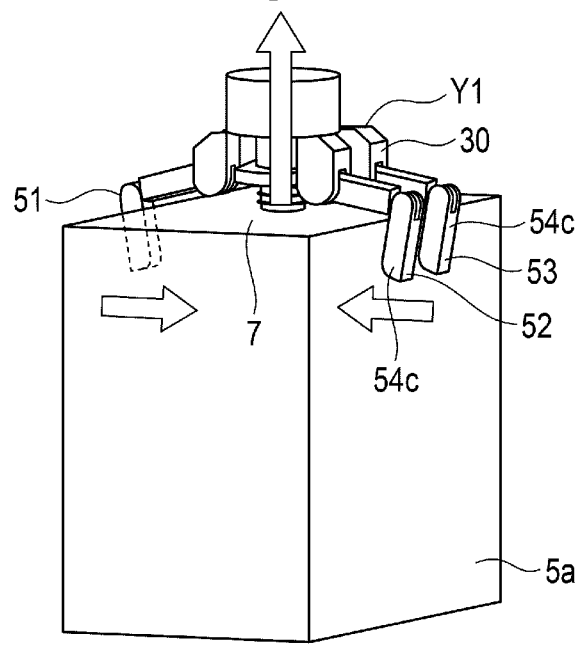
FIG. 12 is a perspective view showing a state where the gripping device of an embodiment is in a gripping posture in a first gripping mode.
Figure 13:
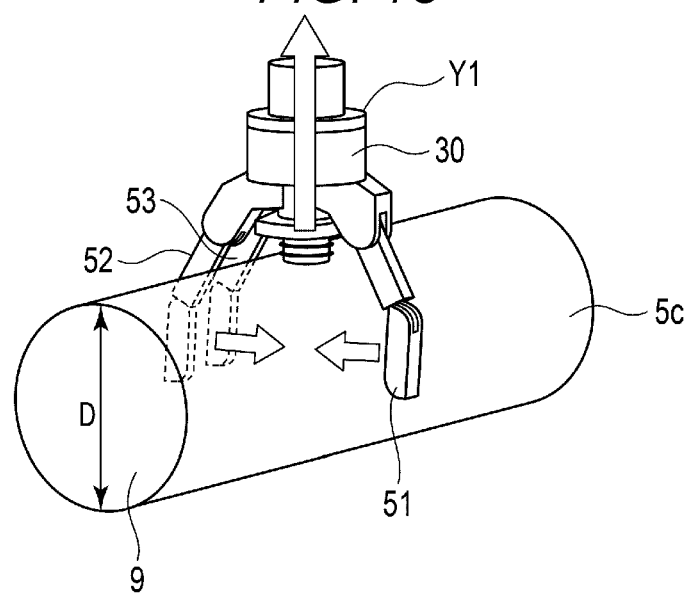
FIG. 13 is a perspective view showing a state where the gripping device of an embodiment grips another article in a gripping posture in the first gripping mode.
Figure 14:
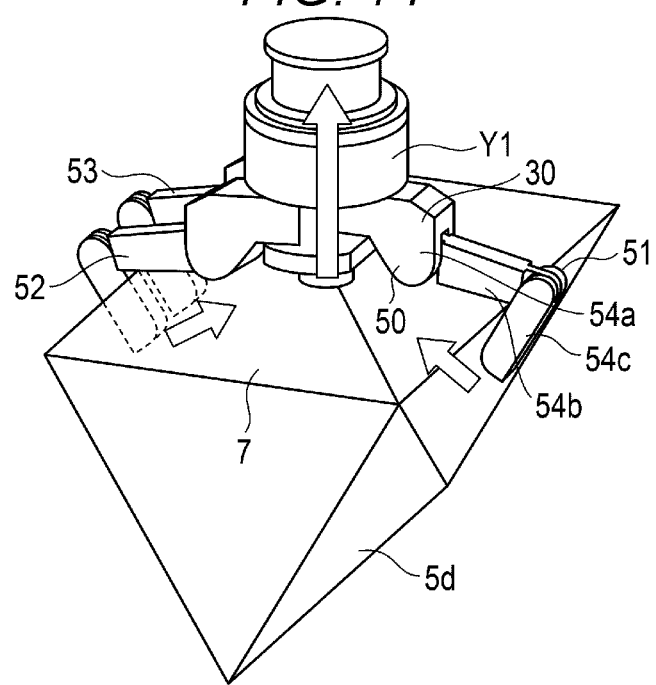
FIG. 14 is a perspective view showing a state where the gripping device of an embodiment grips another article in a gripping posture in a first gripping mode.

FIG. 12 is a perspective view showing a state in which the gripping device 30 grips the article 5 and grips the article 5*a* in the gripping posture in the first gripping mode Y1. FIG. 13 is a perspective view showing a state where the gripping device 30 grips another article 5*c* in a gripping posture in the first gripping mode Y1. FIG. 14 is a perspective view showing a state where the gripping device 30 grips another article 5*d* in a gripping posture in a first gripping mode Y1.

Figure 15:
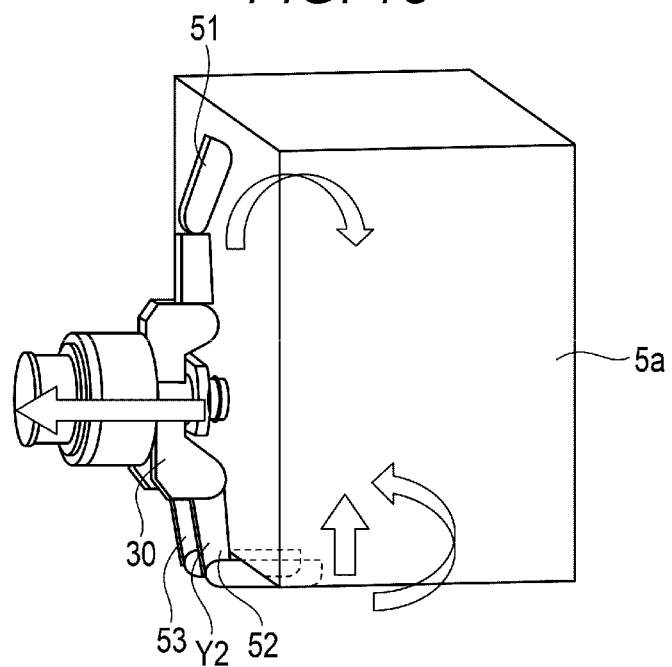
FIG. 15 is a perspective view showing a state where the gripping device of an embodiment grips an article in a gripping posture in a second gripping mode.
Figure 16:
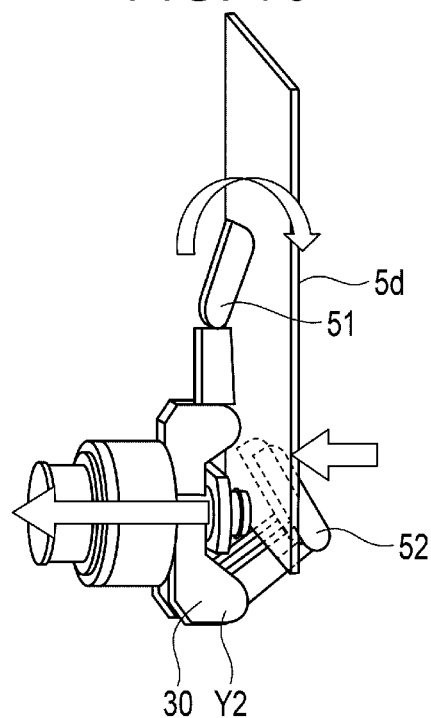
FIG. 16 is a perspective view showing a state where the gripping device of an embodiment grips another article in the gripping posture in the second gripping mode.
Figure 17:
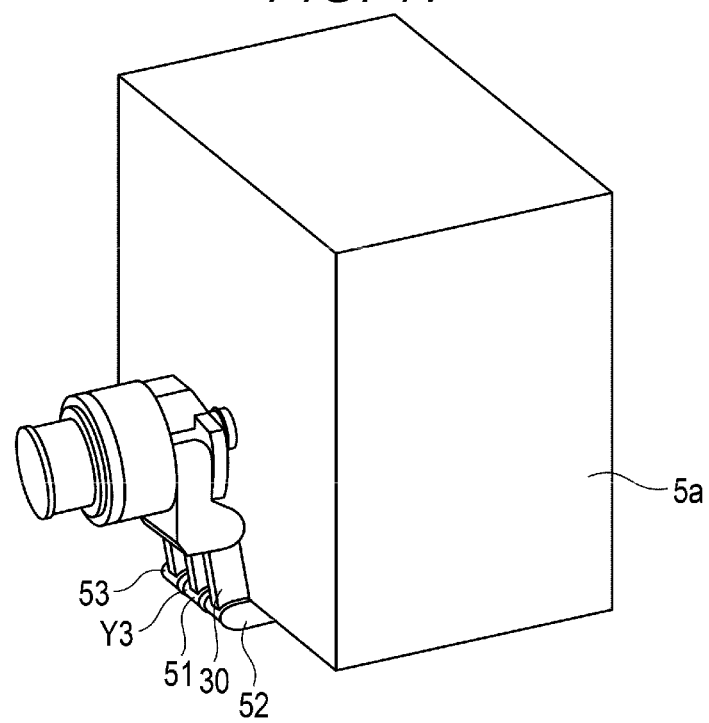
FIG. 17 is a perspective view showing a state where the gripping device according to an embodiment grips an article in a gripping posture in a third gripping mode.
Figure 18:
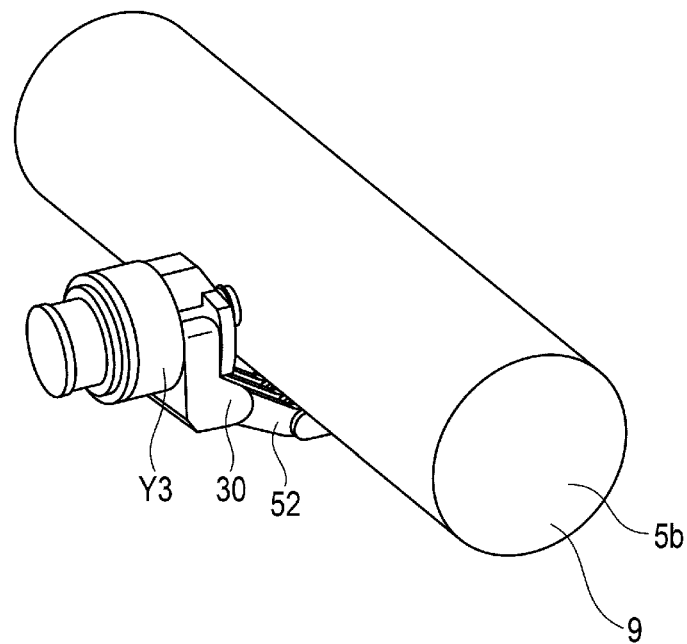
FIG. 18 is a perspective view showing a state where the gripping device according to an embodiment grips another article in the gripping posture in the third gripping mode.
Figure 19:
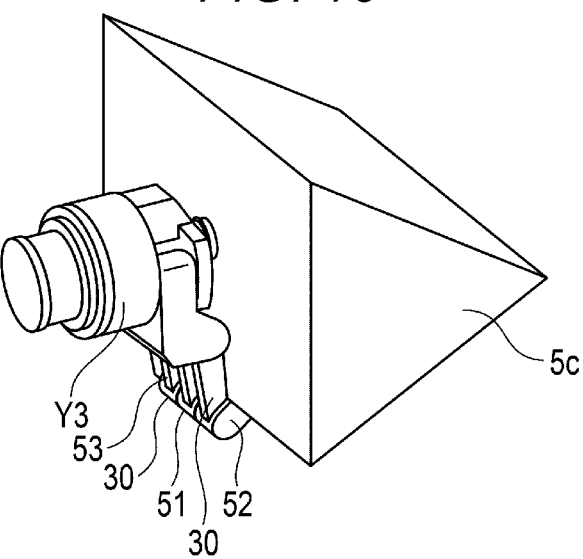
FIG. 19 is a perspective view showing a state where the gripping device of an embodiment grips another article in the gripping posture in the third gripping mode.

FIG. 15 is a perspective view showing a state where the gripping device 30 grips an article 5 in a gripping posture in a second gripping mode Y2. FIG. 16 is a perspective view showing a state where the gripping device 30 grips another article 5*d* in a gripping posture in a second gripping mode Y2. FIG. 17 is a perspective view showing a state where the gripping device 30 grips an article 5*a* in a gripping posture in a third gripping mode Y3. FIG. 18 is a perspective view showing a state where the gripping device 30 grips another article 5*b* in a gripping posture in a third gripping mode Y3. FIG. 19 is a perspective view showing a state where the gripping device 30 grips another article 5*c* in a gripping posture in a third gripping mode Y3. FIG. 29 is a perspective view showing a state where the gripping device 30 grips another article 5*d* in a gripping posture in a fourth gripping mode Y4.

The conveying apparatus 10 is provided in a logistics warehouse, for example. The conveying apparatus 10 is configured to be capable of conveying an article 5 accommodated in a container 6 whose upper end is open, to a destination place such as a belt conveyor.

As shown in FIGS. 1 and 2, the conveying apparatus 10 includes an article detection device 20 which images over an area (a view region 15) and can detect an article 5 in the container 6, a gripping device 30 which can grip the article 5, a moving device 60 which can move the gripping device 30 between the container 6 and a destination, a recognition device 70 which can measure the shape, the size, the posture, and the position of the article 5 based on the detection results of the article detection device 20, an operation plan generation device 80 which generates an operation plan of the gripping device 30 and the moving device 60 based on the detection results of the recognition device 70, and a controller 90 which controls the operation of the moving device 60 based on the operation plan generated by the operation plan generation device 80.

The article detection device 20 is configured to be capable of detecting the article 5 in the container 6. The article detection device 20 is, for example, a 3D camera. The article detection device 20 is configured to be capable of imaging the inside of the container 6 through the opening 6*a* of the container 6.

The article detection device 20 is fixed above the installation place of the logistics warehouse where the container 6 is installed. The article detection device 20 may be fixed to the floor on which the moving device 60 is installed by a column member or the like, for example. Alternatively, the article detection device 20 may be attached to the gripping device 30. Alternatively, the article detection device 20 may be attached to the moving device 60.

The article detection device 20 is not necessarily configured with just one 3D camera. The article detection device 20 may be configured with a plurality of 3D cameras. In a case where the article detection device 20 is configured with a plurality of 3D cameras, each of the 3D cameras preferentially is configured so as to be capable of imaging areas obtained by dividing the inside of the container 6 into a plurality of spaces, and all the inside of the container 6 can be imaged by the 3D cameras.

As shown in FIG. 3, the gripping device 30 includes a base portion 31, a suction mechanism 40 which can suck an article 5 by the suction portion 41, and a clamping mechanism 50 which can clamp an article 5 using a plurality of fingers.

The fingers of the clamping mechanism 50 are connected to the base portion 31. The base portion 31 has a palm portion 32 provided with a suction portion 41. As an example, the palm portion 32 is formed in a rectangular shape in a front view. The surface 33 of the palm portion 32 contacts the article 5 sucked by the suction portion 41. The surface 33 is formed on a flat surface as an example in the present embodiment in order to stabilize the posture of the article 5 sucked by the suction portion 41. The surface 33 is not necessarily flat. The surface 33 may be formed to stably support the article 5 sucked by the suction portion 41.

The suction mechanism 40 has a suction portion 41 provided on the palm portion 32 of the base portion 31 and a negative pressure supplying device 42 (shown in FIG. 1) which applies a negative pressure to the suction portion 41.

As an example, one suction portion 41 is provided in the center of the palm portion 32. The suction portion 41 is formed in a tubular shape that can expand and contract in axial direction thereof. The suction portion 41 can contract in the axial direction of the suction portion 41, for example, until the tip end surface thereof is flush with or substantially flush with the surface 33 of the palm portion 32. Furthermore, since the suction portion 41 can be contracted, the suction portion 41 can return to an original state. As an example, the suction portion 41 is formed in a columnar shape of a bellows from an elastic member.

The suction portion 41 is disposed, for example, at a position shifted in the lateral direction of the palm portion 32 with respect to the center of the palm portion 32. The position of the suction portion 41 with respect to the base portion 31 and the number of suction portions 41 are not limited to a specific position and a specific number.

As shown in FIG. 4, the negative pressure supplying device 42 has a compressor 43, a valve 44, a vacuum generator 45, and a pressure sensor 46. The compressor 43 is connected to the suction portion 41 via a pipe 47. Compressed air from the compressor 43 is supplied to the suction portion 41 through a pipe 47.

The valve 44 is provided in a pipe 47 that connects the compressor 43 to the suction portion 41 and is configured to switch between a state of opening the pipe 47 and a state of closing the pipe 47 in an airtight manner. Opening the pipe 47 permits the compressed air generated by the compressor 43 to be supplied to the suction portion 41. When the pipe 47 is closed in an airtight manner, the compressor 43 and the suction portion 41 are separated in an airtight manner and compressed air from the compressor 43 cannot be supplied to the suction portion 41.

The vacuum generator 45 is a pump. The vacuum generator 45 is connected to the suction portion 41 by, for example, a pipe 47. Specifically, the vacuum generator 45 is connected to a portion of the pipe 47 between the valve 44 and the suction portion 41. The vacuum generator 45 is configured so that a negative pressure can be applied to the suction portion 41 through a pipe 47.

The pipe 47 is disposed, for example, in the robot arm serving as the moving device 60 and in the base portion 31. The pipe 47 is not necessarily disposed inside the moving device 60 and the base portion 31. In another example, the pipe 47 may be disposed outside the moving device 60 and the base portion 31. The pipe 47 is preferably disposed so as not to hinder the operation of the moving device 60 and the operation of the suction mechanism 40.

The pressure sensor 46 is configured to measure the pressure inside the suction portion 41. In the present embodiment, for example, the pressure sensor 46 is provided in a portion between the valve 44 of the pipe 47 and the suction portion 41 and measures the pressure in the suction portion 41 by measuring the pressure in the pipe 47.

As shown in FIGS. 3 to 5, the clamping mechanism 50 is a multi-fingered hand having fingers supported by the base portion 31. The fingers provide at least one combination of two fingers capable of clamping the article 5 by moving in directions toward and away from each other. In the present embodiment, the clamping mechanism 50 has a first finger 51, a second finger 52, and a third finger 53 as fingers in a plurality of fingers.

The first finger 51 and the second finger 52 are disposed on either side of the palm portion 32 with the suction portion 41 interposed therebetween. The third finger 53 is disposed adjacent the second finger 52. The first finger 51 and the second finger 52 form a combination of two fingers capable of clamping the article 5. Similarly, the first finger 51 and the third finger 53 form a combination of two fingers capable of clamping the article 5. As described above, the clamping mechanism 50 has, for example, two combinations of two fingers capable of clamping the article 5.

The first finger 51, the second finger 52, and the third finger 53 have the same configuration. Therefore, the first finger 51 will be described as a representative. The configuration of the second finger 52 and the configuration of the third finger 53 are denoted by the same reference numerals as those attached to the configuration of the first finger 51 and description thereof is omitted.

The first finger 51 has a finger main body 54, a driving mechanism 55 (shown in FIG. 4) for driving the finger main body 54, and a torque sensor 56.

The finger main body 54 includes a plurality of nodes, and these nodes are rotatably connected. In the present embodiment, the finger main body 54 includes a first finger configuration portion 54a fixed to the base portion 31, a second finger configuration portion 54b rotatably connected to the first finger configuration portion 54a, and a third finger configuration portion 54c rotatably connected to an end portion of the second finger configuration portion 54b.

The first finger configuration portion 54a is fixed to the base portion 31 and is disposed at a position opposed to the center of one edge 34 in the longitudinal direction along the longitudinal direction of the palm portion 32 as an example. The first finger configuration portion 54a may be formed integrally with the base portion 31.

As an example, the second finger configuration portion 54b is formed in a shape long in one direction (elongated). One end portion of the second finger configuration portion 54b is rotatably connected to the first finger configuration portion 54a. In other words, the second finger configuration portion 54b and the first finger configuration portion 54a form a first joint 57a that allows the second finger configuration portion 54b to rotate with respect to the first finger configuration portion 54a. The rotation centerline C1 (FIG. 5) of the second finger configuration portion 54b is disposed in parallel to the longitudinal direction of the palm portion 32 as an example.

As an example, the third finger configuration portion 54c is formed in a shape long in one direction. One end portion of the third finger configuration portion 54c is rotatably connected to the other end portion of the second finger configuration portion 54b. In other words, by the third finger configuration portion 54c and the second finger configuration portion 54b, a second joint 57b that makes the third finger configuration portion 54c rotatable with respect to the second finger configuration portion 54b is configured. The rotation centerline C2 (FIG. 5) of the third finger configuration portion 54c is parallel to the rotation centerline C1 of the second finger configuration portion 54b.

The first finger main body 54 configured as described above can be displaced between a state in which the second finger configuration portion 54b and the third finger configuration portion 54c are opened parallel or substantially parallel to the surface 33 of the palm portion 32, and a state in which the second finger configuration portion 54b and the third finger configuration portion 54c are bent toward the suction portion 41, that is, a state where the first finger main body 54 is closed by being angled toward the suction portion 41.

The driving mechanism 55 (FIG. 4) has a driving unit 55a which generates a driving force and a driving force transmission mechanism 55b which transmits the driving force of the driving unit 55a to a finger main body 54. The driving unit 55a is a servomotor, for example. The driving unit 55a has an encoder. The driving unit 55a is configured to be capable of measuring the rotation amount and the rotation speed by its own encoder thereof.

The driving force transmission mechanism 55b is configured to be capable of transmitting the driving force from the driving unit 55a to a finger main body 54. In the present embodiment, the first finger 51 is an inferior driving system in which rotation of the second finger configuration portion 54b and rotation of the third finger configuration portion 54c are performed by one driving unit 55a. Therefore, the driving force transmission mechanism 55b is configured to be capable of transmitting power to the second finger configuration portion 54b and the third finger configuration portion 54c so that the second finger configuration portion 54b is rotatable by the first joint 57a and the third finger configuration portion 54c is rotatable by the second joint 57b by the driving force from the driving unit 55a. In the present embodiment, the third finger configuration portion 54c is driven inferiorly.

The driving force transmission mechanism 55b is configured with any one or combination of a belt and a pulley, a wire and a pulley, or a deceleration structure by a gear, for example. Further, the driving force transmission mechanism 55b is provided with a friction clutch only in the power transmission path to the second finger configuration portion 54b.

When the second finger configuration portion 54b comes into contact with article 5 and the rotation of the second finger configuration portion 54b to a side of the suction portion 41 is regulated, the friction clutch slips due to the driving load from the driving unit 55a. Since the driving force from the driving unit 55a is transmitted only to the third finger configuration portion 54c due to the sliding of the friction clutch, only the third finger configuration portion 54c is driven. In this way, by the action of the friction clutch, the first finger 51, the second finger 52, and the third finger 53 can stably grip the article 5, respectively, since the second finger configuration portion 54b and the third finger configuration portion 54c can be displaced along the shape of the article 5.

The torque sensor 56 is configured to be capable of measuring a torque acting on a node disposed at the tip end, that is, the third finger configuration portion 54c in the present embodiment. The torque sensor 56 may measure the torque acting on the third finger configuration portion 54c based on the current value of the driving unit 55a. The method of sensing the torque by the torque sensor 56 is not limited to this method.

In addition, the clamping mechanism 50 has a second finger supporting mechanism 58 that movably supports the second finger 52, along the outer edge of the palm portion 32, from the initial position P0 indicated by the solid line in FIG. 5 to a first position P1 on the side of the first finger 51 indicated by the two-dot chain line in FIG. 5. The initial position P0 of the second finger 52 is a position opposite to the first finger 51 with the palm portion 32 interposed therebetween.

In addition, the clamping mechanism 50 has a third finger supporting mechanism 59 that movably supports the third finger 53, along the outer edge of the palm portion 32, from the initial position P0 indicated by the solid line in FIG. 5 to the first position P1 on the side of the first finger 51 indicated by the two-dot chain line in FIG. 5. The initial position P0 of the third finger 53 is a position opposite to the first finger 51 with the palm portion 32 interposed therebetween and is a position lateral to the second finger 52 at the initial position P0. The second finger 52 and the third finger 53 are connected to the base portion 31 by the supporting mechanisms 58 and 59.

The second finger supporting mechanism 58 is configured to be movable between the initial position P0 and the first position P1 by rotating the second finger 52 with respect to the base portion 31. The second finger supporting mechanism 58 has a rotation shaft 58a for supporting the second finger 52 so as to be rotatable on the base portion 31 and a driving unit 58b. In the present embodiment, the driving unit 58b is a servo motor as an example. The driving unit 58b is directly or, indirectly via a gear or the like, connected to the rotation shaft 58a. In addition, the second finger supporting mechanism 58 is configured to be capable of fixing the second finger 52 to the initial position P0, the first position P1, the second position P2 disposed at the short side of the palm portion 32, and the third position P3. The third position P3 is any position between the initial position P0 and the second position P2. In the present embodiment, the third position P3 is, for example, a position spaced 120 degrees about the center of the palm portion 32 with respect to the first finger 51. The structure of the second finger supporting mechanism 58 is not limited to the structure described above. The second finger supporting mechanism 58 can move the second finger 52 from the initial position P0 to the third position P3, the second position P2, and the first position P1, and fix the second finger to the initial position P0, the first position P1, the second position P2, and the third position P3.

The third finger supporting mechanism 59 is configured to be movable between the initial position P0 and the first position P1 by rotating the third finger 53 with respect to the base portion 31. The third finger supporting mechanism 59 has a rotation shaft 59a that rotatably supports the third finger 53 to the base portion 31 and a driving unit 59b. In the present embodiment, the driving unit 59b is a servo motor as an example. The driving unit 59b is directly or, indirectly via a gear or the like, connected to the rotation shaft 59a. In addition, the third finger supporting mechanism 59 is configured to be capable of fixing the third finger 53 to the initial position P0, the first position P1, the second position P2 disposed at the short side of the palm portion 32, and the third position P3. The third position P3 is any position between the initial position P0 and the second position P2. In the present embodiment, the third position P3 is, for example, a position spaced 120 degrees about the center of the palm portion 32 with respect to the first finger 51. The structure of the third finger supporting mechanism 59 is not limited to the structure described above. The third finger supporting mechanism 59 can move the third finger 53 from the initial position P0 to the second position P2 and the first position P1 and may fix to the initial position P0, the first position P1, the second position P2, and the third position P3.

The second finger 52 and the third finger 53 may be fixed at positions other than the positions P0, P1, P2, and P3, respectively. The second finger 52 and the third finger 53 are fixed at a position other than the positions P0, P1, P2, and P3, and can be driven also at the fixed position. The third position P3 may be any position as long as the first finger 51, the second finger 52, and the third finger 53 are disposed at equal intervals in the circumferential direction. In the present embodiment, the fingers 51, 52, and 53 are disposed at equal intervals about the center of the palm portion 32.

The clamping mechanism 50 configured as described above can be operated at a state of any of a first arrangement mode V1, a second arrangement mode V2, a third arrangement mode V3, and a fourth arrangement mode V4 as the arrangement mode to arrange the fingers 51, 52, and 53.

The first arrangement mode V1 is a state where the second finger 52 and the third finger 53 are at the initial position P0. In the first arrangement mode, the article 5 can be clamped between the first finger 51 and the second finger 52, and between the first finger 51 and the third finger 53. The maximum clamping width W1 of the clamping mechanism 50 in the first arrangement mode V1 is a length between the second finger configuration portions 54b at a posture of the first finger 51, the second finger 52, and the third finger 53 in which the longitudinal direction of the second finger configuration portion 54b is parallel to the surface 33 of the palm portion 32 and the third finger configuration portion 54c is orthogonal to the second finger configuration portion 54b. The maximum clamping width W1 is the maximum width of an article 5 that can be gripped by the clamping mechanism 50.

The second arrangement mode V2 is a state where the second finger 52 and the third finger 53 are at the first position P1. In the second arrangement mode V2, the rotation centerline C1 of each of the second finger 52 and the third finger 53 is coaxial with the rotation centerline C1 of the first finger 51. In addition, in the second arrangement mode V2, the rotation centerline C2 of each of the second finger 52 and the third finger 53 is coaxial with the rotation centerline C2 of the first finger 51.

The third arrangement mode V3 is a state where the second finger 52 and the third finger 53 are at the second position P2. In the third arrangement mode V3, the second finger 52 and the third finger 53 are opposed to each other in the longitudinal direction of the palm portion 32. The maximum clamping width W2 of the clamping mechanism 50 in the third arrangement mode V3 is a length between second finger configuration portions 54b of the second finger 52 and the third finger 53 at the posture of the second finger 52 and the third finger 53 in which the longitudinal direction of the first finger configuration portion 54a is parallel to the surface 33 of the palm portion 32 and the second finger configuration portion 54b is orthogonal to the first finger configuration portion 54a. The maximum clamping width W2 is longer than the maximum clamping width W1.

The fourth arrangement mode V4 is a state where the second finger 52 and the third finger 53 are at the third position P3. In the fourth arrangement mode, the fingers 51, 52, and 53 are arranged at 120 degrees apart.

As shown in FIG. 1, the moving device 60 is, for example, a six-axis robot arm. A gripping device 30 is fixed to the tip end of the moving device 60. In other words, in the moving device 60, the gripping device 30 is fixed to the link positioned at the tip most end. In the present embodiment, the moving device 60 can move the gripping device 30, and the gripping device 30 is configured to be capable of being displaced in a posture in which the extending direction of the centerline of the suction portion 41 is parallel to various directions.

The recognition device 70 is configured to be capable of measuring the shape, the posture, the size and the position of an article 5 based on the image data imaged by the article detection device 20. Specifically, the recognition device 70 has and is configured to perform processes referred to in the following as function 1, function 2, and function 3.

Function 1 is a process of distinguishing each of the articles 5 and detecting the articles 5 one by one in a case where there is a plurality of articles 5 in the container 6, based on the image data from the article detection device 20. In other words, function 1 is a function of detecting that there are, for example, four articles 5 in a case where there are four articles 5 in the container 6. In the present embodiment, function 1 is a process of performing image processing on the image data transmitted from the article detection device 20, separating a plurality of articles 5 in the container 6 one by one in the image processing, and detecting the articles 5 one by one. In this embodiment, any article 5 that is within the perimeter of another article 5 when imaged by the article detection device 20 in the container 6 is not recognized.

Function 2 is a process of selecting one article 5 from a plurality of articles 5 in the container 6 according to preset conditions. The article 5 selected in function 2 is the article 5 to be conveyed next by the conveying apparatus 10. In this embodiment, function 2 is, for example, a process of selecting an article 5 that is apparently easiest to be conveyed from among a plurality of articles 5.

In function 2, an easy to convey article 5 is selected that satisfies a preset condition. The preset condition is, for example, that the article 5 is positioned at a position that is easy to remove from the inside of the container 6. A condition corresponding to easy to take out from the container 6 is stored in advance in the recognition device 70.

A condition that indicates an easy take out of the article 5 from the inside of the container 6 may be, for example, that the article 5 is at the center of the container 6. This is because an article 5 in the center of container 6 can be relatively easily gripped by the gripping device 30. An alternative condition is that the article 5 is positioned at the highest position in the container 6. In order to achieve function 2 described above, the recognition device 70 measures the position of the articles 5 in the container 6 and selects the article 5 satisfying the conditions described above. In addition, it is also possible to set a plurality of conditions and select the articles 5 satisfying more conditions. The conditions used for identifying articles 5 as easy to be conveyed are not limited to those described above. The preset conditions may include others than just that of easy take out from the inside of the container 6. In addition, the article ultimately selected by function 2 may be an article other than an article that satisfies any condition corresponding to easy to be conveyed.

Function 3 is a process of measuring the shape, the posture, the size, and the position of the article 5 selected by function 2. Specifically, function 3 is a process of performing image processing on the image data imaged by the article detection device 20 and measuring the shape, the posture, the size, and the position of the article 5 that has been selected by function 2.

In a case where any one of the shape, the posture, the size, and the position of the article 5 is measured for function 2, the measured information is not necessarily measured again in function 3 and the information measured in function 2 may be reused.

The shape of the article 5 is, for example, a shape in which the outer appearance is a quadrangular prism shape (including a rectangular parallelepiped and a cube) as shown in FIG. 6. A reference numeral 5a is attached to an article which is a square prism. In an embodiment shown in FIGS. 7 and 8, the outer shape of the article 5 is columnar. An article whose outer appearance is the columnar shape is denoted by reference numeral 5b. In an embodiment shown in FIGS. 9 and 10, the outer shape of the article 5 is a triangular prism. An article whose outer appearance is a triangular prism shape is denoted by reference numeral 5c.

In an embodiment shown in FIG. 11, the outer shape of the article 5 is a plate. An article whose appearance is a plate shape is denoted by reference numeral 5d. The condition to determine as a plate shape is that the thickness is smaller than a preset threshold value. In other words, in a case where the thickness of the article 5d is smaller than the preset threshold value, the recognition device 70 determines that the shape of the article 5d is a plate shape. The shape of the article 5 may be other than the shapes shown in FIGS. 6 to 11 described above. In an embodiment the article has a prism shape with an end surface that is prismatic with five corners or the like, such as a five prism column.

In the present embodiment, information on the shape of the article 5 is stored in the recognition device 70 in advance. The stored information is, for example, information indicating a quadrangular prism shape, a triangular prism shape, a columnar shape, and a plate shape. Function 3 also discriminates the shape of the article 5 based on the information indicating the various shapes described above and stored in advance in the recognition device 70 and the information on the shape of the article 5 obtained by the image processing. The article 5 may not be in the shape of a quadrangular prism shape, a triangular prism shape, a columnar shape, or a plate shape. In a case where the article 5 is neither a quadrangular prism shape, a triangular prism shape, nor a plate shape, the recognition device 70 classifies the article 5 into the closest shape among a quadrangular prism shape, a triangular shape, and a plate shape.

As shown in FIGS. 6 to 11, the posture of the article 5 can be a posture in which the upper surface 7 is a flat surface or a posture in which the upper surface is not a flat surface. In other words, in a case where the shape is a columnar shape like the article 5b, article 5 may present the upper surface 7 as a flat surface as shown in FIG. 7 or may have an axis parallel to the horizontal direction, for example, as shown in FIG. 8 wherein the upper surface 7 is curved.

In addition, in a case where the shape of the article 5c is a triangular prism, as shown in FIG. 9, the article 5 may present the upper surface 7 including one surface or a posture configured by two surfaces 8 as shown in FIG. 10.

The surface 8 referred to here is a surface having a quadrangular prism shape. Thus, function 3 also measures the posture of the article 5 and specifies the upper surface of the article 5.

As a method of measuring a posture, for example, a detection method using Euler angles may be used. Alternatively, the posture of the article 5 may be measured from the image data detected by the article detection device 20. Alternatively, in the present embodiment, since the article detection device 20 is a 3D camera as an example, the posture of the article 5 may be measured from the point group data obtained from the article detection device 20. As a method of specifying the upper surface of the article 5, it is determined that the surface having a vector in which the orthogonal vector is parallel to the vertically downward direction among each surface of the article is an upper surface. In an embodiment, it is determined that the plane where the orthogonal vector is closest in the vertical downward direction is the upper surface. This upper surface determination method is merely an example and is not limited thereto.

In the present embodiment, the size of the article 5 can be a size of a specific portion of the article 5 as determined based on the shape and the posture of the article 5. Thus, function 3 also measures the size of such a specific portion that might be determined based on the shape and the posture of the article 5.

A specific portion of an article 5 in this context will be further explained. In the present embodiment, the gripping device 30 moves upward with respect to the article 5 disposed in the container 6, and if the gripping operation is possible from a state where the gripping device is positioned above the article 5, the upper portion of the article 5 can be clamped by the clamping mechanism 50. Therefore, the specific portion of this article 5 in this instance is the upper portion of the article 5 while in the container 6. An aspect of function 3 will be described including the operation of the recognition device 70. As shown in FIG. 6, function 3 measures the length 8a of the long side, the length 8b of the short side of the upper surface 7 and the height H of the article 5 with respect to the article 5, which has a quadrangular prism shape.

In addition, function 3 measures the diameter D of the upper surface 7 and the height H of the article 5b with respect to the article 5b which is a columnar shape has a posture in which the upper surface thereof is a flat surface, as shown in FIG. 7. In addition, as shown in FIG. 8, function 3 measures the diameter D and the length L in the axial direction of the end surface 9 with respect to the article 5b which has a columnar shape and has a posture in which the upper surface 7 is a curved surface.

In addition, as shown in FIG. 9, function 3 measures the lengths 9a, 9b, and 9c of the three sides of the upper surface 7, and the height H of the article 5c with respect to the article 5c, which has a triangular prism shape and has a posture in which the upper surface 7 is a flat surface. In addition, as shown in FIG. 10, function 3 measures a length L in the axial direction and each of the lengths of four sides of both surfaces 8 with respect to the article 5c, which has a triangular prism shape and has a posture in which the upper surface 7 includes the two surfaces 8. In addition, as shown in FIG. 11, function 3 is a function of measuring the length of the long side of the upper surface 7 with respect to the article 5d having a plate shape.

In the present embodiment, function 3 measures the size of the portions described above as the specified portion so as to classify the article 5 into one of a quadrangular prism shape, a triangular prism shape, a columnar shape, and a rectangular plate shape, and specify a portion to be clamped by the clamping mechanism 50 according to the shape and size in advance. For this reason, measuring the size of only a specific portion by function 3 is an example, and the present embodiment is not limited thereto. Function 3 may measure the size of not only a specific portion of article 5 but also all portions of the article 5.

The position of the article 5 was measured by function 2 in the present embodiment. For this reason, information on the position measured by function 2 is reused with respect to the position of the article 5.

The operation plan generation device 80 determines the suction surface based on the detection result of the recognition device 70, determines the gripping mode, determines the suctioned portion 4 to be sucked by the suction portion 41 in the article 5, and generates a gripping posture of the gripping device 30, a gripping preparation posture of the gripping device 30, a gripping plan, and a trajectory plan of the moving device 60. The suction surface described here is based on a state where the suction surface is disposed in the container 6 of the article 5. In other words, it is not based on the posture of the article 5 which is gripped by the gripping device 30 and which is in a state where the gripping device 30 is in the gripping posture. For this reason, for example, even in a case where the suction surface is set as the upper surface, the suction surface may be set as the side surface in the gripping posture.

[Explanation of Suction Surface Determination, Explanation of Gripping Mode, and Explanation of Suctioned Portion]

The gripping modes include a first gripping mode Y1, a second gripping mode Y2, and a third gripping mode Y3.

The first gripping mode Y1 is a gripping mode which clamps the article 5 by a surface which becomes the side surface facing the suction surface by the clamping mechanism 50 in the first arrangement mode V1, the third arrangement mode V3, or the fourth arrangement mode V4, as shown in FIGS. 12, 13, and 14.

The second gripping mode Y2 is a gripping mode which supports the lower end of the article 5 by the fingers 52 and 53 of the clamping mechanism 50 and supports the suction surface by the first finger 51 in the first arrangement mode V1, as shown in FIGS. 15 and 16.

The third gripping mode Y3 is a gripping mode which supports the lower end of the article 5 by the clamping mechanism 50 in the second arrangement mode V2, as shown in FIG. 17.

The portion to be sucked by the suction portion 41 when the gripping device 30 is in the selected gripping mode is set as the suctioned portion 4. In other words, the suctioned portion 4 is a portion where the gripping device 30 can grip the article 5 according to the selected gripping mode.

Next, selection of the gripping mode and determination of the suctioned portion 4 will be described. In a case where the article 5 placed in the container 6 can be gripped from above, the operation plan generation device 80 sets the upper surface 7 of the article 5 as a suction surface. Specifically, as shown in FIG. 6, the operation plan generation device 80 determines the upper surface 7 as the suction surface to be sucked by the suction portion 41 with respect to the article 5a having a quadrangular prism shape. In a case where the length 8b of the short side of the upper surface 7 of the article 5a is equal to or smaller than the maximum clamping width W2 of the clamping mechanism 50 in the third arrangement mode V3, the first gripping mode Y1 is selected. In a case of being in the first gripping mode Y1, the suction portion 41 is disposed at an intermediate position between the finger 51 and the fingers 52 and 53. Therefore, the operation plan generation device 80 determines the center of the upper surface 7 of the article 5a as the suctioned portion 4. In this way, the operation plan generation device 80 determines the suctioned portion 4 based on the selected gripping mode.

In a case where the length 8b of the short side of the upper surface 7 is larger than the maximum clamping width W2 of the clamping mechanism 50 in the third arrangement mode V3, the operation plan generation device 80 selects the second gripping mode Y2 or the third gripping mode Y3. Specifically, in a case where the weight of the article 5a is larger than a preset threshold value, the operation plan generation device 80 selects the third gripping mode Y3. This is because the third gripping mode Y3 supports the lower end surface of the article 5 with the three fingers 51, 52, and 53 so that the heavy article 5 can be more stably supported. The operation plan generation device 80 estimates the weight of the article 5a from the size of the article 5a, in an embodiment.

In a case where the operation plan generation device 80 selects the second gripping mode Y2, the operation plan generation device 80 sets a portion having a length from the center of the suction portion 41 to the third finger configuration portion 54c of the fingers 52 and 53 and from the intermediate position of the large side of one side of the upper surface 7 to the inside of the upper surface 7 parallel to the short side, to the suctioned portion 4 so that the article 5a can be gripped by the gripping device 30 which is in the second gripping mode Y2. By determining the suctioned portion 4 as the position described above, the gripping device 30 can place the article 5a on the third finger configuration portion 54c of the fingers 52 and 53. In other words, the gripping device 30 can grip the article 5a in the second gripping mode Y2.

In a case where the operation plan generation device 80 selects the third gripping mode Y3, the operation plan generation device 80 sets a portion having a length from the center of the suction portion 41 to the third finger configuration portion 54c of the first finger 51 and from the intermediate position of the large side of one side of the upper surface 7 to the inside of the upper surface 7 parallel to the short side, to the suctioned portion 4 so that the article 5a can be gripped by the gripping device 30 which is in the third gripping mode Y3. By determining the suctioned portion 4 to the position described above, the gripping device 30 can place the article 5a on the third finger configuration portion 54c of the fingers 52 and 53. In other words, the gripping device 30 can grip the article 5a in the third gripping mode Y3.

As shown in FIG. 7, with respect to the article 5b having a column shape and a posture in which the upper surface 7 is a flat surface, the upper surface 7 is determined as the suction surface. In a case where the diameter D of the upper surface 7 of the article 5b is equal to or smaller than the maximum clamping width W2 of the clamping mechanism 50 in the third arrangement mode V3, the first gripping mode Y1 is selected. Then, the operation plan generation device 80 sets the center of the upper surface 7 to the suctioned portion 4 so that the article 5b can be gripped in the first gripping mode Y1. The suction portion 41 is sucked to the upper surface 7 such that centerline thereof passes through the center of the upper surface 7.

In a case where the diameter D of the upper surface 7 is larger than the maximum clamping width W2 of the clamping mechanism 50 in the third arrangement mode V3, the side surface is determined as the suction surface. Then, the operation plan generation device 80 selects the second gripping mode Y2 or the third gripping mode Y3. Specifically, in a case where it is determined that the article 5b is heavier than the predetermined weight described above, the third gripping mode Y3 is selected. Then, the operation plan generation device 80 sets the axial intermediate position of the side surface of the article 5b to the suctioned portion 4.

As shown in FIG. 8, with respect to the article 5b having a column shape and a posture in which the upper surface is a curved surface, the operation plan generation device 80 determines the upper surface as the suction surface. The upper surface referred to here is the upper portion of the curved surface of the article 5b. The side surface is a lower portion of the upper surface in the circumferential surface. Then, in a case where the outer diameter of the end surface is equal to or smaller than the maximum clamping width, the operation plan generation device 80 selects the first gripping mode Y1.

In a case where the outer diameter of the end surface is larger than the maximum clamping width, the operation plan generation device 80 determines the suction surface as the side surface. Then, the operation plan generation device 80 selects the second gripping mode Y2 or the third gripping mode Y3. Specifically, as described above, in a case where the article 5b is heavier than the predetermined weight, the operation plan generation device 80 selects the third gripping mode Y3. Then, the operation plan generation device 80 sets the intermediate position of the upper surface 7 of the article 5b in the axial direction to the suctioned portion 4.

As shown in FIG. 9, with respect to the article 5c having a triangular prism shape and a posture in which the upper surface 7 is a flat surface, when the operation plan generation device 80 determines that the article 5c can be clamped from the upper side by the clamping mechanism 50 in the fourth arrangement mode V4, the operation plan generation device 80 determines the upper surface 7 as the suction surface, and selects the first gripping mode Y1.

Specifically, the operation plan generation device 80 has information on a triangular prism article 5c which can be clamped by the clamping mechanism 50 in the fourth arrangement mode V4. Specifically, the operation plan generation device 80 supports one side surface by the first finger 51 of the clamping mechanism 50 in the fourth arrangement mode V4, supports one side surface by the second finger 52, and has information on an article 5c that can support one side surface by the third finger 53. Based on this information, the operation plan generation device 80 determines whether or not the article 5c can be gripped from above by the clamping mechanism 50 in the fourth arrangement mode V4. In this case, the operation plan generation device 80 determines the suctioned portion 4 of the upper surface 7 according to the shape of the upper surface 7. For example, in a case where the upper surface 7 is an equilateral triangle, the center of the upper surface 7 is the suctioned portion 4 to be sucked by the suction portion 41. Alternatively, in a case where the upper surface 7 is not an equilateral triangle, a position where the three side surfaces can be stably clamped by the fingers 51, 52, and 53 is set as the suctioned portion 4. In other words, a portion where the clamping mechanism 50 in the fourth arrangement mode V4 is capable of clamping the article 5c in the first gripping mode Y1 is set as the suctioned portion 4.

When the operation plan generation device 80 determines that the article 5c cannot be clamped by the clamping mechanism 50 in the fourth arrangement mode V4, one of the three side surfaces of the article 5c is set to be a suction surface to be suctioned by the suction portion 41. Specifically, among the three side surfaces, the side surface that can be accessed by the gripping device 30 is the suction surface. Then, the operation plan generation device 80 selects the second gripping mode Y2 or the third gripping mode Y3. Specifically, in a case where the operation plan generation device 80 determines that the article 5c is heavier than the predetermined weight described above, the operation plan generation device 80 selects the third gripping mode Y3.

In a case where the operation plan generation device 80 selects the second gripping mode Y2, the operation plan generation device 80 sets the intermediate position of the article 5c in the axial direction on the side surface as the suction surface and a portion which is the length from the center of the suction portion 41 to the third finger configuration portion 54c of the second finger 52 and the third finger 53 is set as the suctioned portion 4 from the edge to the inside along the axial direction on the side surface.

In a case where the operation plan generation device 80 selects the third gripping mode Y3, the operation plan generation device 80 sets the intermediate position of the article 5c in the axial direction on the side surface as the suction surface and a portion which is the length from the suction portion 41 to the third finger configuration portion 54c of the first finger 51 is set as the suctioned portion 4 from the edge to the inside along the axial direction on the side surface.

As shown in FIG. 10, with respect to an article 5c having a triangular prism shape and a posture in which an upper surface 7 is configured with two surfaces 8, the operation plan generation device 80 determines a suction surface in which a length of the short side is equal to or smaller than the maximum clamping width W2 of the clamping mechanism 50 in the third arrangement mode V3 among the two surfaces 8 which configures the upper surface 7. In a case where the two surfaces 8 are surfaces whose length of the short side is equal to or smaller than the maximum clamping width W2 of the clamping mechanism 50 in the third arrangement mode V3, for example, the selected suction surface has the larger area among the two surfaces. Then, the operation plan generation device 80 selects the first gripping mode Y1, and sets the center of the suction surface as the suctioned portion 4.

In addition, in a case where the length of each short side of the two surfaces 8 which configures the upper surface 7 is larger than the maximum clamping width W2 of the clamping mechanism 50 in a state of the third arrangement mode V3, the operation plan generation device 80 determines one of the surfaces 8 as the suction surface. Then, the operation plan generation device 80 selects the second gripping mode Y2. Then, the operation plan generation device 80 is located on the intermediate position of the article 5c in the axial direction on the surface 8 set as the suction surface and sets a position which is a length from the center of the suction portion 41 to the third finger configuration portion 54c of the second finger 52 along a direction parallel to the lateral direction from the edge to the inside along the longitudinal direction of the surface 8 as the suctioned portion 4.

As shown in FIG. 11, with respect to the article 5d having a plate shape, the operation plan generation device 80 sets the main surface to which the gripping device 30 can access to the suction surface. For example, as shown in FIG. 11, in a case where one main surface configures the upper surface 7, the upper surface 7 is set as the suction surface. Then, the operation plan generation device 80 selects the second gripping mode Y2. Then, the operation plan generation device 80 sets as suctioned portion 4 a position which is the length from the center of the suction portion 41 to the second finger configuration portion 54b of the second finger 52 along a direction parallel to the short side from the intermediate position of the short side of the upper surface 7 to the inside along the short side of the upper surface.

[Description of Gripping Posture]

Next, the gripping posture will be described. The gripping posture indicates the position of the gripping device 30, the posture of the gripping device 30, the state of the clamping mechanism 50, and the postures of the fingers 51, 52, and 53, which can stably grip the article 5 by the gripping device 30.

The position of the gripping device 30 is represented by coordinates of three axes orthogonal to each other, for example. The coordinates of these three axes are information indicating the position commonly used by the moving device 60 and the gripping device 30. The posture of the gripping device 30 is a posture in the coordinate system of the three axes in the direction in which the centerline of the suction portion 41 extends.

The operation plan generation device 80 determines the gripping posture based on the position of the suctioned portion 4 of the article 5 and the circumstances around the article 5. The circumstances around the article 5 are the gaps between the article 5 to be gripped by the gripping device 30 and the article 5 disposed around the gripping device or gaps between the article 5 which becomes a target and the inside surface of the container 6.

Specifically, the operation plan generation device 80 determines the position of the gripping device 30, which is an element of the gripping posture, according to the position of the article 5 which become a target. The operation plan generation device 80 determines the posture of the gripping device 30 which is an element of the gripping posture according to the suction surface of the article 5.

In this embodiment, the operation plan generation device 80 selects one of the first arrangement mode V1, the second arrangement mode V2, the third arrangement mode V3, and the fourth arrangement mode V4 as the state of the clamping mechanism 50, which is an element of the gripping posture, based on the position of the suctioned portion 4 of the article 5, the circumstance around the article 5, and the gripping mode selected as described above.

The selection of the state of the clamping mechanism 50 and the posture of the gripping device 30 in the gripping posture will be specifically described. As shown in FIG. 6, with respect to the article 5a which is a quadrangular prism, the operation plan generation device 80 selects the first arrangement mode V1 by setting a case where the length of the short side of the upper surface 7 is equal to or smaller than the maximum clamping width W1 of the clamping mechanism 50 in the first arrangement mode V1 and the gripping mode Y1 is selected to the state of the clamping mechanism 50.

In this case, as shown in FIG. 12, the posture of the gripping device 30 in the gripping posture is a posture in which the centerline of the suction portion 41 is parallel to the up and down direction by the suction portion 41 sucking the suctioned portion 4 and the clamping mechanism 50 in the first arrangement mode V1 clamps the article 5a in a direction parallel to the short side of the upper surface 7 by the first gripping mode Y1.

In addition, the operation plan generation device 80 selects the third arrangement mode V3 by setting a case where the short side of the upper surface 7 is larger than the maximum clamping width W1 of the clamping mechanism 50 in the first arrangement mode V1 and is equal to or smaller than the maximum clamping width W2 of the clamping mechanism 50 in the third arrangement mode V3 and the first gripping mode Y1 is selected to a state of the clamping mechanism 50.

In this case, the posture of the gripping device 30 in the clamping posture is a posture in which the centerline of the suction portion 41 is parallel to the up and down direction with the suction portion 41 sucking the suctioned portion 4 and the clamping mechanism 50 in the third arrangement mode V3 clamping the article 5*a* in a direction parallel to the short side of the upper surface 7 with the first gripping mode Y1.

In addition, the operation plan generation device 80 selects the first arrangement mode V1 by setting a case which is larger than the maximum clamping width W2 of the clamping mechanism 50 in the third arrangement mode V3 and a case where the second gripping mode Y2 is selected to a state of the clamping mechanism 50.

In this case, as shown in FIG. 15, the posture of the gripping device 30 in the gripping posture is a posture in which the centerline of the suction portion 41 is parallel to the horizontal direction with the suction portion 41 sucking the suctioned portion 4 and the clamping mechanism 50 in the first arrangement mode V1 sucking the side surface of the article 5 with the second gripping mode. In a state where the article 5 is disposed in the container 6, the suction surface is the upper surface of the article 5. After the suction portion 41 sucks the upper surface of the article 5, the gripping device 30 is displaced, whereby the suction surface is changed to the side surface.

In addition, the operation plan generation device 80 selects the second arrangement mode V2 by setting a case which is larger than the maximum clamping width W2 of the clamping mechanism 50 in the third arrangement mode V3 and a case where the third gripping mode Y3 is selected to a state of the clamping mechanism 50.

In this case, as shown in FIG. 17, the posture of the gripping device 30 in the gripping posture is a posture in which the centerline of the suction portion 41 is the horizontal direction with the suction portion 41 sucking the suctioned portion 4 and the clamping mechanism 50 in the second arrangement mode V2 supporting the lower end surface of the article 5 with the third gripping mode Y3. In a state where the article 5 is disposed in the container 6, the suction surface is the upper surface of the article 5. After the suction portion 41 sucks the upper surface of the article 5, the suction surface is changed to the side surface by the gripping device 30 being displaced.

In addition, as shown in FIG. 7, with respect to the article 5*b* having a columnar shape of which the upper surface 7 is a flat surface, the operation plan generation device 80 selects the first arrangement mode V1 in a case where the diameter D of the upper surface 7 is equal to or smaller than the maximum clamping width W1 of the clamping mechanism 50 in the first arrangement mode V1 and selects the first gripping mode Y1 as a state of the clamping mechanism 50.

In this case, the posture of the gripping device 30 in the gripping posture is a posture in which the centerline of the suction portion 41 is parallel to the up and down direction as in FIG. 12.

In addition, the operation plan generation device 80 selects a state of the third arrangement mode V3 as a state of the clamping mechanism 50 in a case where the diameter D of the upper surface 7 is larger than the maximum clamping width W1 of the clamping mechanism 50 in a state of the first arrangement mode V1, is equal to or smaller than the maximum clamping width W2 of the clamping mechanism 50 in a state of the third arrangement mode V3, and selects the first gripping mode Y1.

In this case, the posture of the gripping device 30 in the gripping posture is a posture in which the centerline of the suction portion 41 is parallel to the up and down direction as in FIG. 12.

In addition, as shown in FIG. 8, with respect to the article 5*b* which has a columnar shape and whose upper surface 7 is curved, the operation plan generation device 80 selects the first arrangement mode V1 or the third arrangement mode V3 as a state of the clamping mechanism 50, as illustrated in FIG. 13, in a case where the diameter of the end surface is equal to or smaller than the maximum clamping width W2 of the clamping mechanism 50 in the third arrangement mode V3.

Specifically, in a case where the diameter of the end surface 9 of the article 5*b* is equal to or smaller than the maximum clamping width W1 of the clamping mechanism 50 in the first arrangement mode V1 and the first gripping mode Y1 is selected, the operation plan generation device 80 selects the first arrangement mode V1 as the state of the clamping mechanism 50. In this case, as shown in FIG. 13, the posture of the gripping device 30 in the gripping posture is a posture in which the centerline of the suction portion 41 is parallel to the up and down direction by the suction portion 41 sucking the sucked portion 4 of the upper surface which becomes the curved surface of the article 5*b* and the clamping mechanism 50 of the first arrangement mode V1 clamps the article 5*b* in the radial direction of the article 5*b*.

The operation plan generation device 80 selects the third arrangement mode V3 as the state of the clamping mechanism 50, in a case where the diameter D of the end surface 9 of the article 5*b* is larger than the maximum clamping width W1 of the clamping mechanism 50 in the first arrangement mode V1, is equal to or smaller than the maximum clamping width W2 of the clamping mechanism 50 in the third arrangement mode V3, and the first gripping mode Y1 is selected. In this case, as in the case of FIG. 13, the posture of the gripping device 30 in the gripping posture is a posture in which the centerline of the suction portion 41 is parallel to the up and down direction, by the suction portion 41 sucking the suctioned portion 4 of the upper surface 7 which becomes the curved surface of the article 5*b* and the clamping mechanism 50 in the third arrangement mode V3 clamping the article 5*b* in the radial direction of the article 5*b*, as in FIG. 13.

The operation plan generation device 80 selects the first arrangement mode V1 as a state of the clamping mechanism 50 in a case where the diameter D of the end surface 9 of the article 5*b* is larger than the maximum clamping width W1 of the clamping mechanism 50 in the first arrangement mode V1, is larger than the maximum clamping width W2 of the clamping mechanism 50 in the third arrangement mode V3, and the second gripping mode Y2 is selected. In this case, the posture of the gripping device 30 in the gripping posture is a posture in which the centerline of the suction portion 41 is parallel to the horizontal direction, as in FIG. 15.

The operation plan generation device 80 selects the second arrangement mode V2 as a state of the clamping mechanism 50, in a case where the diameter D of the end surface 9 of the article 5*b* is larger than the maximum clamping width W1 of the clamping mechanism 50 in the first arrangement mode V1, is larger than the maximum clamping width W2 of the clamping mechanism 50 in the third arrangement mode V3, and the third gripping mode Y3 is selected. In this case, the posture of the gripping device 30 in the gripping posture is a posture in which the centerline of the suction portion 41 is parallel to the horizontal direction, as in FIG. 17.

In addition, as shown in FIG. 9, with respect to the article 5c which has a triangular prism shape and of which the upper surface 7 is a flat surface, the operation plan generation device 80 selects the fourth arrangement mode V4 of the clamping mechanism 50, as a state of the clamping mechanism, in a case where the article 5c can be clamped from above by the clamping mechanism 50 in the fourth arrangement mode V4 and the first gripping mode Y1 is selected.

In this case, as shown in FIG. 19, the posture of the gripping device 30 in the gripping posture is a posture in which the centerline of the suction portion 41 is parallel to the up and down direction by the suction portion 41 sucking the suctioned portion 4 of the upper surface 7 of the article 5c, the first finger 51 abuts against one of three side surfaces, the second finger 52 abuts against one of the two remaining side surfaces, and the third finger 53 abuts against the one remaining side surface in the clamping mechanism 50 to clamp the article 5c.

In addition, the operation plan generation device 80 selects the first arrangement mode V1 in a case of determining that it is impossible to grip the article 5 by the clamping mechanism 50 in the fourth arrangement mode V4 and thus selecting the second gripping mode Y2. In this case, the posture of the gripping device 30 in the gripping posture is a posture in which the centerline of the suction portion 41 is parallel to the horizontal direction, as in FIG. 15.

In addition, the operation plan generation device 80 selects the second arrangement mode V2, in a case of determining that it is impossible to grip the article 5 by the clamping mechanism 50 in the fourth arrangement mode V4 and selecting the third gripping mode Y3. In this case, the posture of the gripping device 30 in the gripping posture is a posture in which the centerline of the suction portion 41 is parallel to the horizontal direction, as in FIG. 19.

In addition, as shown in FIG. 10, with respect to the article 5c which has a triangular prism shape and of which upper surface 7 is configured with two surfaces 8, the operation plan generation device 80 selects the first arrangement mode V1 or the third arrangement mode V3 as a state of the clamping mechanism 50, as shown in FIG. 14, in a case where a length of the short side of the surface 8 determined as the suction surface is equal to or smaller than the maximum clamping width W2 of the clamping mechanism 50 in the third arrangement mode V3 and the first gripping mode Y1 is selected.

Specifically, in a case where the short side of the surface 8 serving as the suction surface is equal to or smaller than the maximum clamping width W1 of the clamping mechanism 50 in the first arrangement mode V1, the operation plan generation device 80 selects the first arrangement mode V1 as a state of the clamping mechanism 50. In this case, as in FIG. 14, the posture of the gripping device 30 in the gripping posture is a posture in which the suction portion 41 is sucked to the suctioned portion 4 of the surface 8 determined as the suction surface and the clamping mechanism 50 in the first arrangement mode V1 clamps the article 5c in a direction parallel to the short side of the surface 8 serving as the suction surface by the first gripping mode Y1 and the centerline of the suction portion 41 is parallel to the up and down direction.

The operation plan generation device 80 selects the third arrangement mode V3 as a state of the clamping mechanism 50, in a state where the short side of the surface 8 serving as the suction surface is larger than the maximum clamping width W1 of the clamping mechanism 50 in the first arrangement mode V1, is equal to or smaller than the maximum clamping width W2 of the clamping mechanism 50 in the third arrangement mode V3, and the first gripping mode Y1 is selected. In this case, as in FIG. 14, the posture of the gripping device 30 in the gripping posture is a posture in which the suction portion 41 sucks the suctioned portion 4 of the surface 8 determined as the suction surface, the clamping mechanism 50 in the third arrangement mode V3 clamps the article 5c in a direction parallel to the short side of the suction surface by the first gripping mode Y1, and the centerline of the suction portion 41 is parallel to the up and down direction.

The operation plan generation device 80 selects the first arrangement mode V1 as a state of the clamping mechanism 50, in a case where the short side of the surface 8 serving as the suction surface is larger than the maximum clamping width W2 of the clamping mechanism 50 in the third arrangement mode V3, and the second gripping mode Y2 is selected. In this case, the posture of the gripping device 30 in the gripping posture is a posture in which the centerline of the suction portion 41 is parallel to the horizontal direction as in FIG. 15.

The operation plan generation device 80 selects the second arrangement mode V2 as a state of the clamping mechanism 50, in a case where the short side of the surface 8 serving as the suction surface is larger than the maximum clamping width W2 of the clamping mechanism 50 in the third arrangement mode V3 and the third gripping mode Y3 is selected. In this case, the posture of the gripping device 30 in the gripping posture is a posture in which the centerline of the suction portion 41 is parallel to the horizontal direction as in FIG. 17.

With respect to the article 5d having a rectangular plate shape, in a case where the second gripping mode Y2 is selected, the operation plan generation device 80 selects the first arrangement mode V1 as a state of the clamping mechanism 50. In this case, as shown in FIG. 16, the posture of the gripping device 30 in the gripping posture is a posture in which the centerline of the suction portion 41 is parallel to the horizontal direction. Alternatively, in a case where the third gripping mode Y3 is selected, the second arrangement mode V2 is selected as the state of the clamping mechanism 50. In this case, the posture of the gripping device 30 in the gripping posture is a posture in which the centerline of the suction portion 41 is parallel to the horizontal direction, as shown in FIG. 17.

Next, the postures of the fingers 51, 52, and 53, which are elements of the gripping posture, will be described. The postures of the fingers 51, 52, and 53 are determined based on the state of the suctioned portion 4, the gripping mode, and the clamping mechanism 50, selected as described above and in which the fingers 51, 52, and 53 stably support the article 5. In the present embodiment, since the fingers 51, 52, and 53 have the finger configuration portions 54b and 54c, the postures of the fingers 51, 52, and 53 are the angles of the second finger configuration portion 54b and the third finger configuration portion 54c of each of the fingers 51, 52, and 53.

The gripping preparation posture indicates the position of the gripping device 30 and the posture of the gripping device 30 at the time of starting the gripping operation with respect to the article 5. A state of the clamping mechanism 50 in the gripping preparation posture is the same as the state in the gripping posture. The posture of the fingers 51, 52, and 53 in the gripping preparation posture is, for example, a posture in which the fingers 51, 52, and 53 are fully opened as shown in FIG. 1.

In the present embodiment, as an example, the posture of the gripping device 30 in the gripping preparation posture is a posture in which in a case where the suction surface of the article 5 is a flat surface, the centerline of the suction portion 41 is parallel to a direction orthogonal to the suction surface and a posture in which in a case where the suction surface of the article 5 is a curved surface, and the centerline of the suction portion 41 is parallel to the normal line of the suctioned portion 4.

In the present embodiment, the position of the gripping device 30 in the gripping preparation posture is, as an example, in a position at which the centerline of the suction portion 41 passes through the suctioned portion 4 and the suction portion 41 is spaced apart from the article 5 by a predetermined distance determined in advance.

The gripping plan is operation information for operating the moving device 60 and the gripping device 30, which is necessary for displacing the gripping device 30 from the gripping preparation posture to the gripping posture. Specifically, the gripping plan is information such as the rotation angle of each driving unit 55a of the gripping device 30, and the rotation angle of various motors generating the driving force of the moving device 60.

The trajectory plan of the moving device 60 is information on operating of the moving device 60 for moving the gripping device 30 in the gripping posture and the article 5 gripped by the gripping device 30 in the gripping posture to a destination place without being in contact with another surrounding article or other structure. In the present embodiment, the trajectory planning is operating information necessary for moving the article 5 to the destination place at the shortest distance without touching the surroundings. Specifically, the operation information is the rotation angle of various motors of the moving device 60, and the like.

In addition, the operation plan generation device 80 has a first control mode and a second control mode. According to the article 5, the operation plan generation device 80 selects the first control mode or the second control mode.

The first control mode is a mode in which the article 5 is clamped by the clamping mechanism 50 after the article 5 is sucked by the suction portion 41. The second control mode is a mode in which the article 5 is clamped by the clamping mechanism 50 and then the article 5 is sucked by the suction portion 41.

The controller 90 is configured to control operation of the moving device 60. The controller 90 also controls the moving device 60 based on the trajectory plan generated by the operation plan generation device 80.

Figure 20:
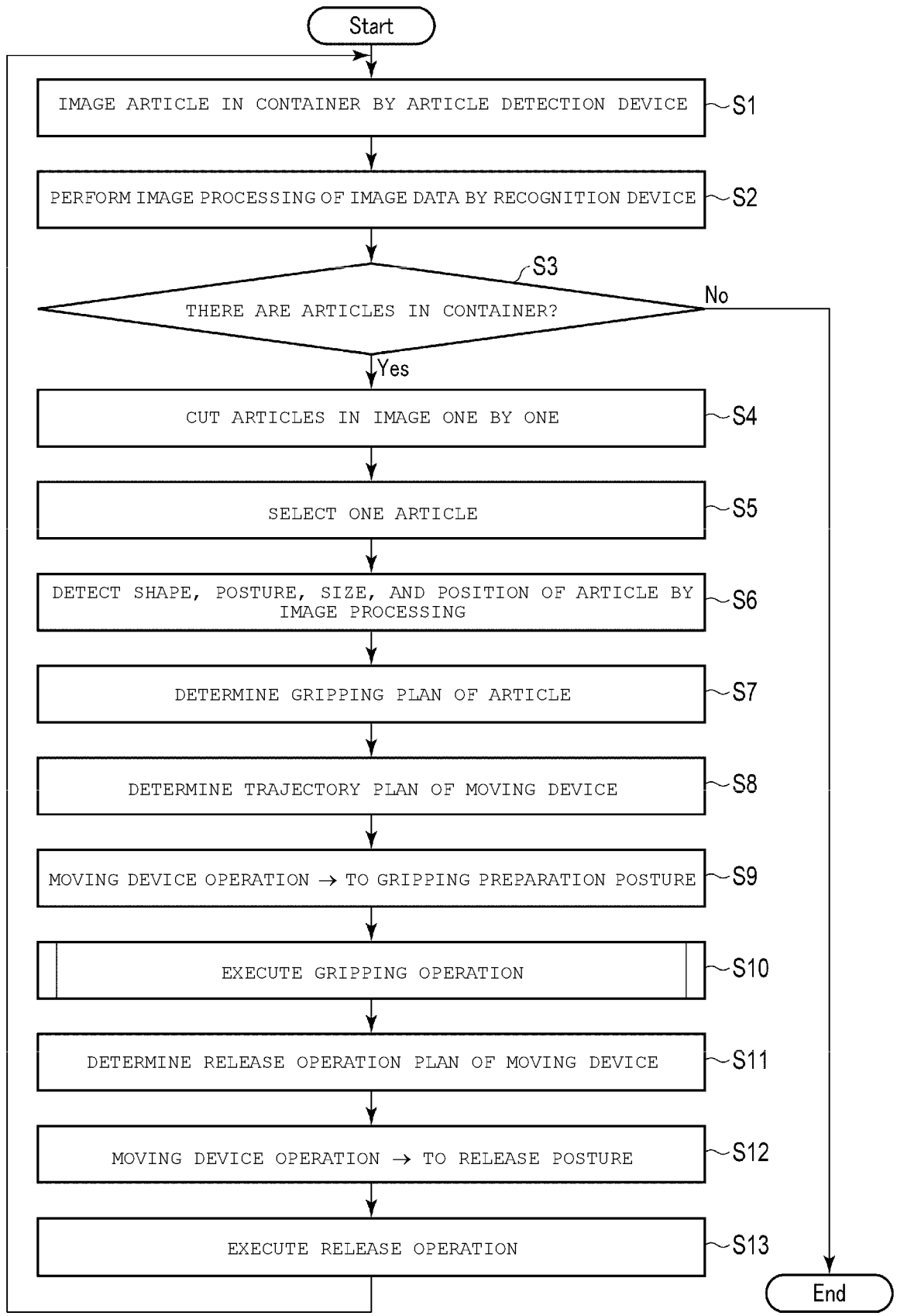
FIG. 20 is a flowchart showing an operation of the conveying apparatus of an embodiment.
Figure 21:
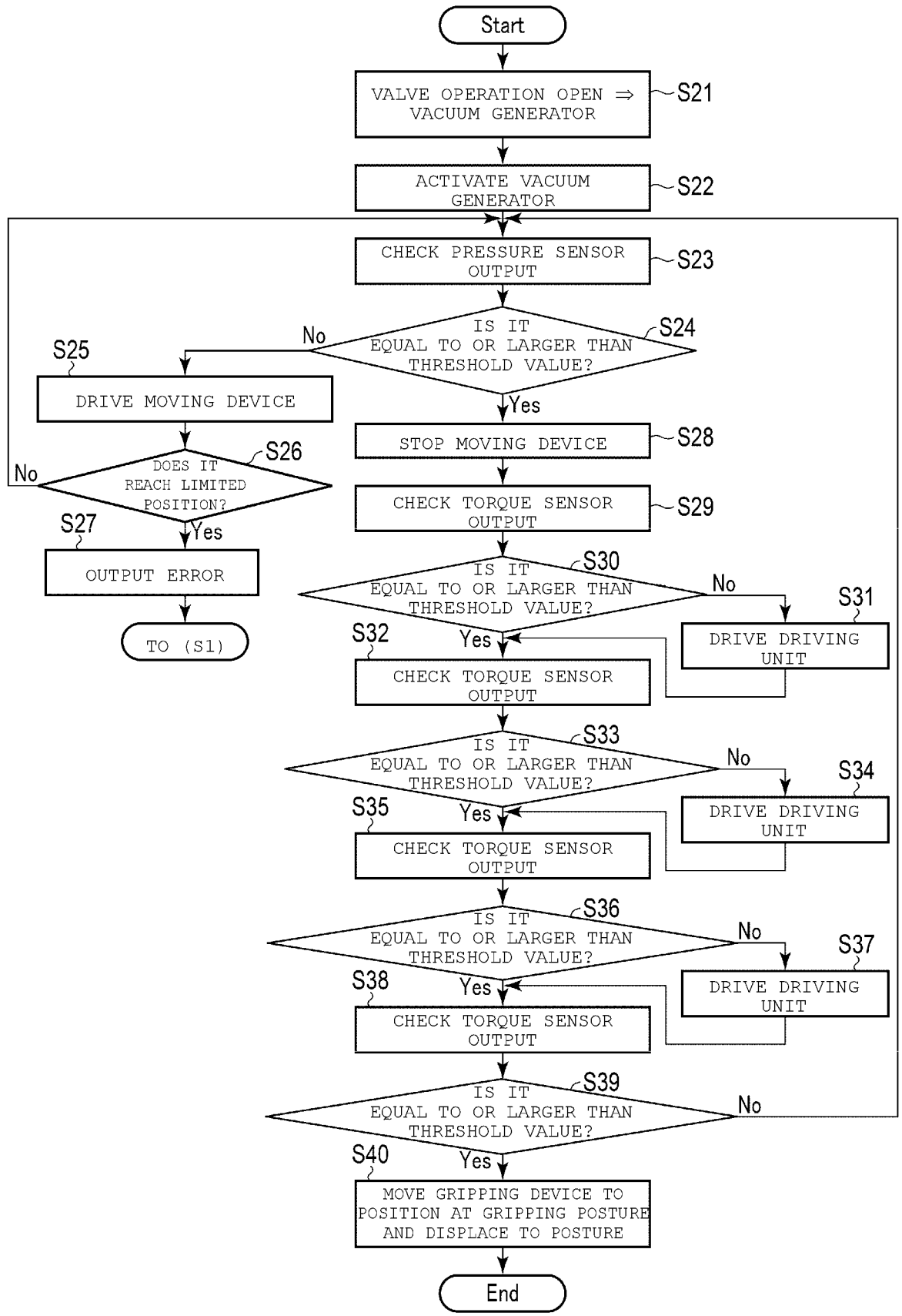
FIG. 21 is a flowchart showing a main portion of the operation of the conveying apparatus of an embodiment.

Next, the operation of the conveying apparatus 10 will be described with reference to FIGS. 20 to 28. FIG. 20 is a flowchart showing the operation of the conveying apparatus 10. FIG. 21 is a flowchart showing a main portion of the operation of the conveying apparatus 10. FIG. 21 is a flowchart specifically showing the operation of the conveying apparatus 10 in the first control mode.

Figure 22:
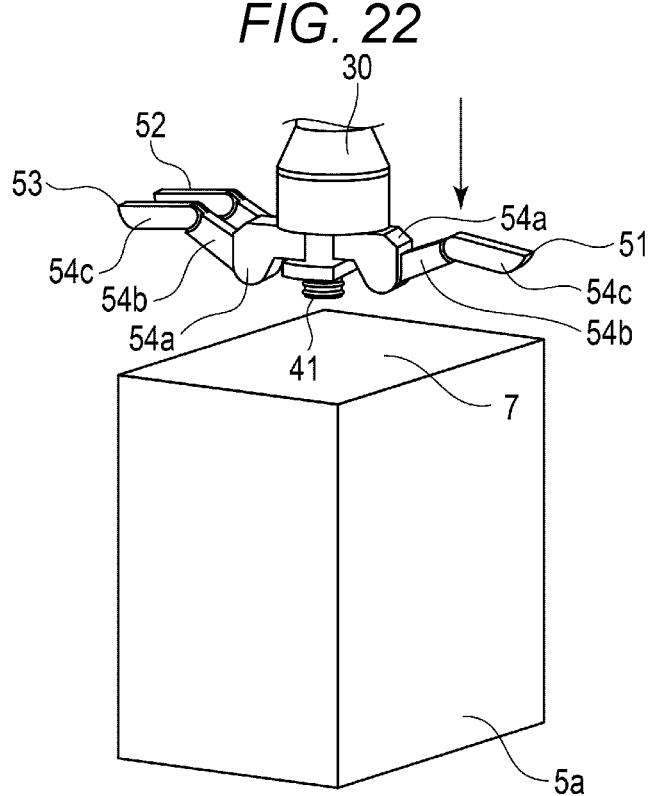
FIG. 22 is a perspective view showing an operation in which the conveying apparatus of an embodiment grips an article in the first control mode.
Figure 23:
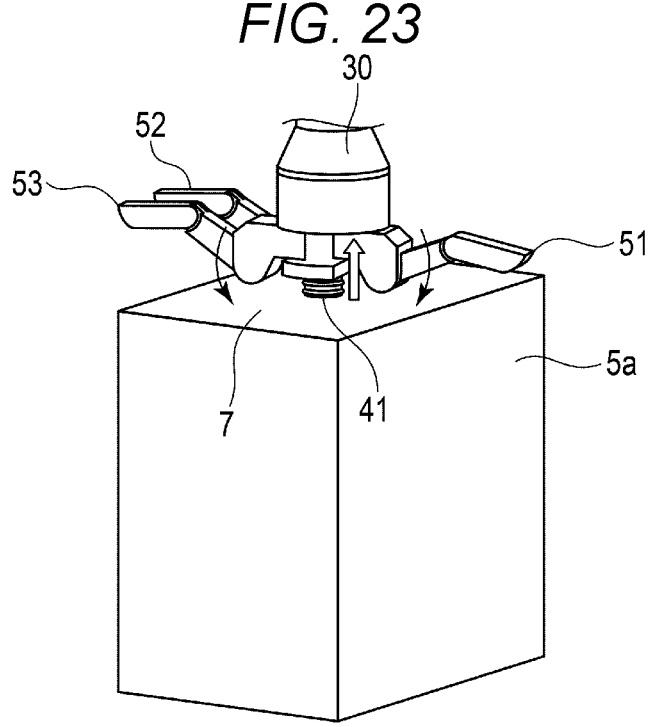
FIG. 23 is a perspective view showing an operation in which the conveying apparatus of an embodiment grips an article in the first control mode.
Figure 24:
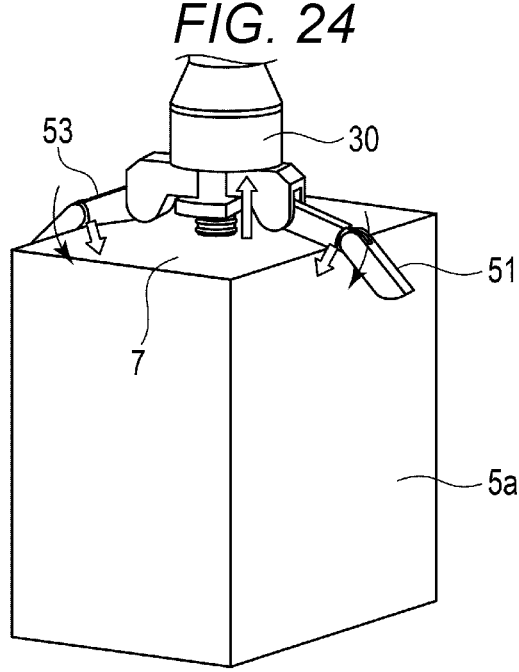
FIG. 24 is a perspective view showing an operation in which the conveying apparatus of an embodiment grips an article in the first control mode.
Figure 25:
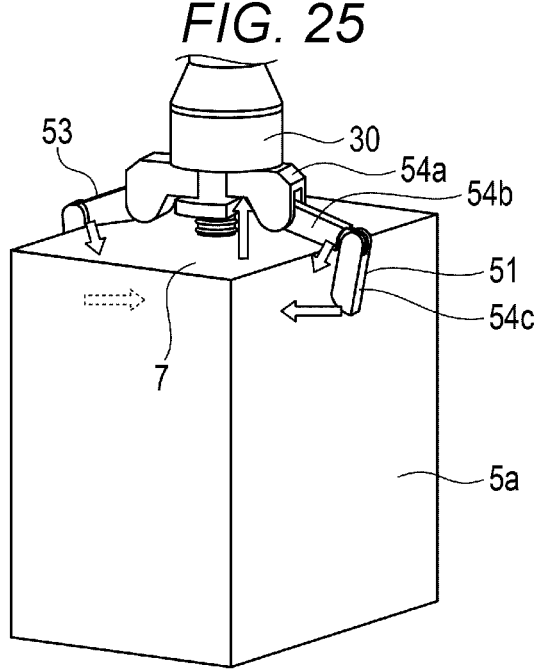
FIG. 25 is a perspective view showing an operation in which the conveying apparatus of an embodiment grips an article in the first control mode.

FIG. 22 is a perspective view showing an operation of the conveying apparatus 10 gripping the article 5a in the first control mode. FIG. 23 is a perspective view showing an operation of the conveying apparatus 10 gripping the article 5a in the first control mode. FIG. 24 is a perspective view showing an operation of the conveying apparatus 10 gripping the article 5a in the first control mode. FIG. 25 is a perspective view showing the operation of the conveying apparatus 10 gripping the article 5a in the first control mode.

Figure 26:
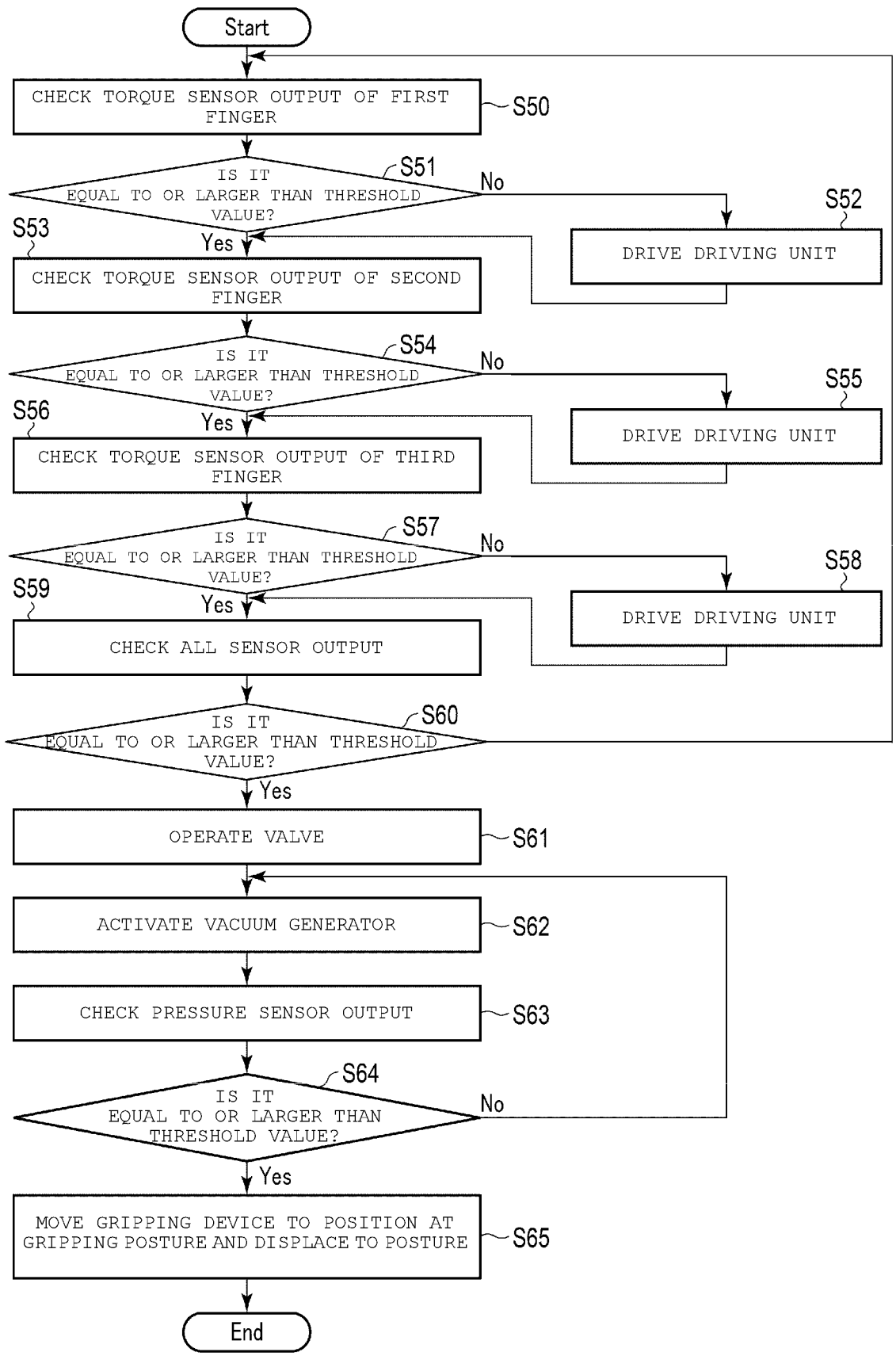
FIG. 26 is a flowchart showing a main portion of an operation of the conveying apparatus of an embodiment.
Figure 27:
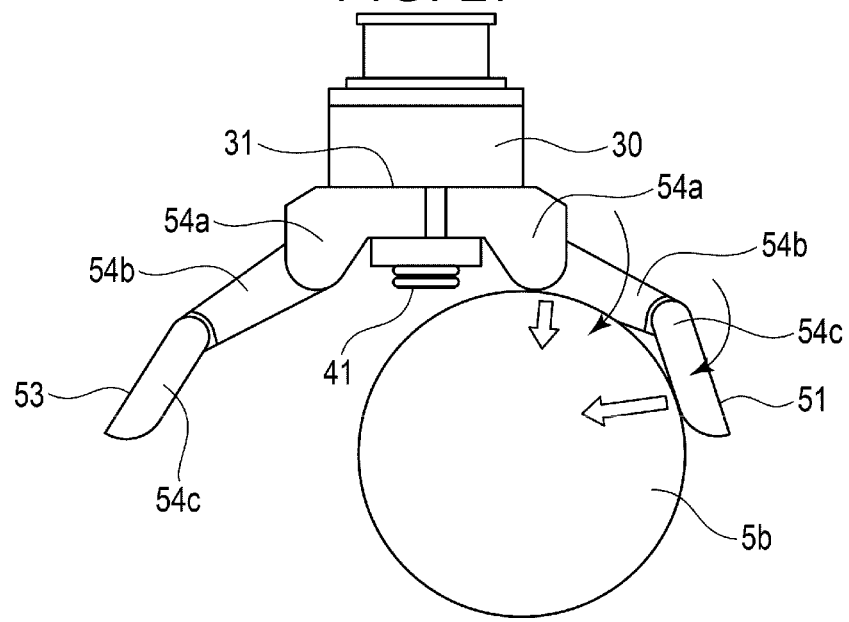
FIG. 27 is a perspective view showing the operation in the second control mode of the conveying apparatus of an embodiment.
Figure 28:
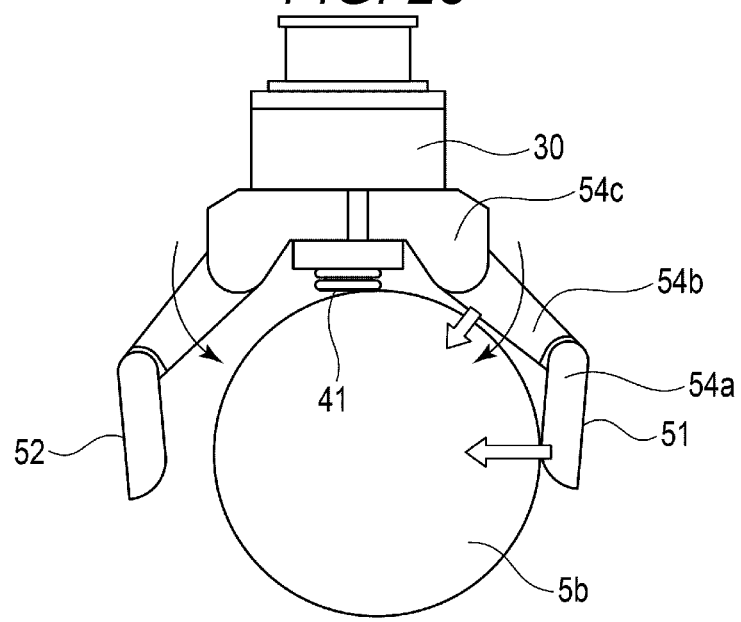
FIG. 28 is a perspective view showing an operation in the second control mode of the conveying apparatus of an embodiment.

FIG. 26 is a flowchart showing the main portion of the operation of the conveying apparatus 10. FIG. 26 is a flowchart specifically showing the operation of the conveying apparatus 10 in the second control mode. FIG. 27 is a perspective view showing the operation of the conveying apparatus 10 in the second control mode. FIG. 28 is a perspective view showing the operation of the conveying apparatus 10 in the second control mode.

As shown in FIG. 20, the article detection device 20 images the inside of the container 6 (step S1). The article detection device 20 transmits the data of the photographed image to the recognition device 70.

The recognition device 70 performs image processing on the image data transmitted from the article detection device 20 (step S2). The recognition device 70 confirms the presence or absence of the article 5 in the container 6 based on the result of the image processing (step S3). When the recognition device 70 determines that there is no article 5 in the container 6 (No in step S3), the recognition device 70 ends the operation (End).

When the recognition device 70 determines that the article 5 is present in the container 6 based on the result of the image processing (Yes in step S3), the recognition device 70 performs image processing of the image data again by function 1, in a case where there are a plurality of articles 5, the articles 5 are recognized one by one (step S4). In other words, in a case where there is a plurality of articles 5 in the container 6, the recognition device 70 recognizes the plurality of articles 5 one by one by so-called cutting each.

Upon recognizing the plurality of articles 5 in the container 6 one by one, the recognition device 70 selects one article 5 from the plurality of articles 5 by function 2 (step S5). In this embodiment, the article 5, which becomes a target, to be conveyed next is selected by the conveying apparatus 10. This selection criterion is that the article is easy to move from the inside of the container 6 as described above. The recognition device 70 selects the article 5 which is easy to move based on the situation in the container 6 obtained by image processing.

When the recognition device 70 selects one article 5 from a plurality of articles 5, the recognition device 70 performs the image processing again by function 3 and measures the shape, the posture, the size, and the position of the selected article 5 (step S6).

Upon detecting the shape, the posture, the size, and the position of the selected article 5, the recognition device 70 sends the measured information, that is, information on the shape, the posture, the size, and the position of the selected article 5 to the operation plan generation device 80 (step S6).

Here, an example of the operation of the recognition device 70 in step S6 will be described. A case where the article 5 selected in step S5 is the article 5a which has a quadrangular prism shape, of which the posture is a posture in which the upper surface 7 thereof is a flat surface, and of which the length of the short side of the upper surface 7 is equal to or smaller than the maximum clamping width W1 of the clamping mechanism 50 in the first arrangement mode V1, as shown in FIG. 6, the recognition device 70 determines that the shape of the article 5a selected in step S5 is a quadrangular prism shape.

In addition, the recognition device 70 determines that the posture of the article 5a is a posture in which the upper surface 7 thereof is a flat surface. In addition, with respect to the size of the article 5a, the recognition device 70 determines that the short side of the upper surface 7 is equal to or smaller than the maximum clamping width W1 of the clamping mechanism 50 in the first arrangement mode V1.

In addition, the recognition device 70 measures the position of the article 5a in the container 6. The recognition device 70 transmits the information on the shape, the posture, the size, and the position of the article 5a to the operation plan generation device 80.

Upon receiving the information from the recognition device 70, the operation plan generation device 80 selects the first gripping mode Y1 as the gripping mode based on the received information, determines the suctioned portion 4 which is sucked by the suction portion 41 in the article 5a, generates the gripping preparation posture of the gripping device 30 and the gripping preparation state of the gripping device 30, and selects the first control mode or the second control mode for the article 5 (step S7).

Here, a case where the article 5 is the article 5a which has a quadrangular prism shape, of which the posture is a posture in which the upper surface 7 is a flat surface, and of which the length of the short side of the upper surface 7 is equal to or smaller than a maximum clamping width W1 of the clamping mechanism 50 in the first arrangement mode V1 with respect to the operation in step S7 of the operation plan generation device 80, as shown in FIG. 6, will be described.

The operation plan generation device 80 first determines the upper surface 7 as the suction surface to be sucked by the suction portion 41. Next, the operation plan generation device 80 selects the first gripping mode Y1 as a gripping mode. Next, in addition, the operation plan generation device 80 determines the center of the upper surface 7 as the suctioned portion 4 since the length of the short side of the upper surface 7 of the article 5a is equal to or smaller than the maximum clamping width W2 of the clamping mechanism 50 in the third arrangement mode V3.

Further, the operation plan generation device 80 selects the first arrangement mode V1 as a state of the clamping mechanism 50. Further, the operation plan generation device 80 generates a gripping posture based on the information on the position of the article 5a in the container 6 and the position of another article 5 around the article 5a.

Further, the operation plan generation device 80 generates a gripping preparation posture. Specifically, the operation plan generation device 80 becomes a posture in which the first to third fingers 51, 52, and 53 of the clamping mechanism 50 in the first arrangement mode V1 are maximally opened and the centerline of the suction portion 41 is parallel to the direction orthogonal to the upper surface 7. Further, the operation plan generation device 80 determines the position at which the centerline of the suction portion 41 passes through the suctioned portion 4 set in the article 5a and the suction portion 41 is spaced apart from the article 5a by a predetermined distance as the position of the gripping device 30 in the gripping preparation posture.

Further, in a case where the article 5 has a shape difficult to move, the operation plan generation device 80 selects the first control mode, and in a case where the article 5 has a shape that is easy to move, the operation plan generation device 80 selects the second control mode. The term "easy to move" means that the article is easy to move within the container 6. For example, the article 5a which has a columnar shape and a posture in which the upper surface is a curved surface is easy to roll. In this way, the term easy to roll means easy to move. The operation plan generation device 80 stores data on shapes that are easy to move in advance. For example, a shape whose lower surface is a curved surface is easy to move. The columns are stored as shapes that are easy to move. Therefore, the operation plan generation device 80 selects the first control mode with respect to the article 5a.

When the operation plan generation device 80 generates the gripping preparation posture and the gripping posture of the article 5 and selects the first control mode or the second control mode, the operation plan generation device 80 makes the gripping device 30 in the gripping preparation posture and the trajectory plan for setting the gripping preparation posture from the current position is generated. In addition, when generating the trajectory plan, the operation plan generation device 80 transmits the trajectory plan to the controller 90 (step S8).

Upon receiving the trajectory plan from the operation plan generation device 80, the controller 90 operates the moving device 60 based on the trajectory plan to set the gripping device 30 to the gripping preparation posture. Specifically, the moving device 60 adjusts the direction in which the suction portion 41 faces. In other words, in a case where the suction surface set on the article 5 is a flat surface, the moving device 60 causes the gripping device 30 to be displaced to a posture in which the centerline of the suction portion 41 is parallel to the direction perpendicular to the suction surface and the gripping device can grip at the selected gripping mode. In a case where the suction surface set on the article 5 is a curved surface, the moving device 60 causes the gripping device 30 to be displaced to a posture in which the centerline of the suction portion 41 is parallel to the normal line of the suctioned portion 4 (step S9).

When the gripping device 30 is displaced to the gripping preparation posture, the operation plan generation device 80 controls the gripping device 30, and the controller 90 controls the moving device 60 so that the gripping device 30 grips the article 5 and displaces the gripping device 30 in the gripping posture (step S10).

Here, as an example of the operation of the operation plan generation device 80 and the controller 90 in step S10, a case where the article 5 is the article 5a which has a quadrangular prism shape, of which a posture is a posture in which the upper surface 7 is a flat surface, and of which the size of the short side of the upper surface 7 is equal to or smaller than the maximum clamping width W1 of the clamping mechanism 50 in the first arrangement mode V1, as shown in FIG. 6, will be described. The flow chart shown in FIG. 21 shows a specific flow in step S10.

FIG. 22 shows a state where the gripping device 30 is in the gripping preparation posture. As shown in FIG. 21, the operation plan generation device 80 first opens the valve 44 (step S21). The operation plan generation device 80 next activates the vacuum generator 45 (step S22). Next, the operation plan generation device 80 compares the detection result of the pressure sensor 46 with a preset threshold value (step S23 and step S24).

The detection result of the pressure sensor 46 increases when the suction portion 41 is sucked by the article 5. The threshold value described above is a value for determining whether or not the suction portion 41 is sucked to the article 5. If the detection result of the pressure sensor 46 is equal to or larger than the threshold value, it is determined that the suction portion 41 is sucked to the article 5. The threshold value is set to a value at which the suction portion 41 does not come off the article 5 even when the gripping device 30 is moved. The threshold value can be obtained in advance by experiments or the like.

When the operation plan generation device 80 determines that the detection result of the pressure sensor 46 is smaller than the threshold value (No in step S24), the controller 90 drives the moving device 60 to cause the suction portion 41 to bring closer to the article 5a (step S25). Specifically, the controller 90 controls the moving device 60 so as to move the suction portion 41 to a side of the article 5a along a direction parallel to the centerline of the suction portion 41.

A limit value is set for the movement amount of the moving device 60. The limit value is an amount by which the gripping device 30 further moves a predetermined distance beyond the measured position of the article 5. The controller 90 determines whether or not the movement amount of the moving device 60 has reached the limit value (step S26). In other words, the controller 90 determines whether or not the position of the moving device 60 is at the limit position when the movement amount reaches the limit value.

Until the moving device 60 reaches the limit position, the controller 90 monitors the position of the moving device 60 (No in step S23, step S24, step S25, and step S26). When the controller 90 determines that the detection result of the pressure sensor 46 is smaller than the threshold value even in a state where the moving device 60 is moved to the limit position (Yes in step S26), the controller 90 informs of the error (step S27). For notification of this error, it may be any notification as long as the surrounding workers can understand. The error notification is, for example, a lamp flash or the like or a sound from a speaker.

When the operation plan generation device 80 determines that the detection result of the pressure sensor 46 is equal to or larger than the threshold value (Yes in step S24), the controller 90 stops the moving device 60 (step S28). As shown in FIG. 23, this state is a state where the suction portion 41 is sucking the suctioned portion 4.

When the controller 90 makes the moving device 60 stationary, the operation plan generation device 80 confirms the output of the torque sensor 56 of each of the first finger 51, the second finger 52, and the third finger 53 (step S29).

The operation plan generation device 80 determines whether or not the detection result of the torque sensor 56 of the first finger 51 is equal to or larger than the threshold value. In a state where the first finger 51 is pressing the article 5a, the detection result of the torque sensor 56 increases. The threshold value referred to here is the torque in a state where the clamping mechanism 50 clamps the article 5 with a sufficient clamping force. The sufficient clamping force is a clamping force to the extent that the article 5 does not fall when the article 5 is moved from the container 6 to the destination place. The threshold value can be obtained by experiment in advance. The threshold value may be determined depending on the gripping posture. In other words, the threshold value in the first gripping mode Y1, the threshold value in the second gripping mode Y2, and the threshold value in the third gripping mode Y3 may be different from each other.

When determining that the detection result of the torque sensor 56 of the first finger 51 is smaller than the threshold value (No in step S30), as shown in FIG. 24, the operation plan generation device 80 drives the driving unit 55a of the first finger 51 so as to clamp the article 5a by the clamping mechanism 50 (step S31).

In addition, the operation plan generation device 80 similarly confirms the detection result of the torque sensor 56 even with respect to the second finger 52 and the third finger 53 (steps S32 and S35), and compares the detection result of the torque sensor 56 with the threshold value (steps S33 and S36), and drives the driving unit 55a (steps S34 and S37).

In addition, as long as the detection results of the respective torque sensors 56 of the first finger 51, the second finger 52, and the third finger 53 are smaller than the threshold values (step S38, and No in step S39), the operation plan generation device 80 drives the respective driving units 55a of the first finger 51, the second finger 52, and the third finger 53 based on the gripping posture generated in step S7 (steps S23 to S39)

When the operation plan generation device 80 determines that the detection results of the torque sensors 56 of the first finger 51, the second finger 52, and the third finger 53 are equal to or larger than the threshold value (step S38, and Yes in step S39), the operation plan generation device 80 determines that the clamping of the article 5a by the clamping mechanism 50 is completed, as shown in FIG. 25.

The operation plan generation device 80 determines the posture of the fingers 51, 52, and 53 as the gripping posture. The operation plan generation device 80 drives the driving unit 55a so that the fingers 51, 52, and 53 are in the determined gripping posture. Confirmation of the detection value of the torque sensor in steps S32, 35, and 38 is for feedback.

The operation plan generation device 80 and the controller 90 displace the posture of the gripping device 30 when determining that the clamping of the article 5a is completed. In a case where the posture of the article 5a at the time of completion of gripping is the same as the posture of in the gripping posture, the posture is left as it is. In addition, the controller 90 drives the moving device 60 to move the gripping device 30 to the position in the gripping posture (step S40). In step S40, either the movement of the position or the displacement of the posture may be performed first.

As described above, when the operation of step S10 is completed, the operation plan generation device 80 generates a trajectory plan of the moving device 60 for moving the gripping device 30 from the gripping posture to the destination place. When the generation of the trajectory plan is completed, the operation plan generation device 80 sends the trajectory plan to the controller 90 (step S11).

The controller 90 drives the moving device 60 based on the trajectory plan received from the operation plan generation device 80 and moves the gripping device 30 to the destination place (step S12). When the gripping device 30 is moved to the destination place, the operation plan generation device 80 drives the suction mechanism 40 and the clamping mechanism 50 to release the article 5a (step S13). The operation plan generation device 80 and the controller 90 repeat the operation from step S1 to step S11 until all the articles 5 in the container 6 are moved to the destination place.

Even in a case where the second gripping mode Y2 or the third gripping mode Y3 is selected as the gripping mode, the gripping device 30 can grip the article 5 by the operations of step S1 to step S39 shown in FIGS. 20 and 21. In a case where the second gripping mode Y2 or the third gripping mode Y3 is selected as the gripping mode, in step S10, after the suction of the article 5 is completed by the suction mechanism 40, before the clamping mechanism 50 is driven, the article 5 may be moved upward by driving the moving device 60 by the controller 90.

In a case where the second gripping mode Y2 is selected, the amount of movement is sufficient to secure the movement allowance of the second finger 52 and the third finger 53 so that the second finger 52 and the third finger 53 support the lower end surface of the article 5. In a case where the third gripping mode Y3 is selected, the amount of movement is sufficient to secure the movement allowance of the first finger 51, the second finger 52, and the third finger 53 so that the first finger 51, the second finger 52 and the third fingers 53 support the lower end surface of the article 5.

Next, the operation of the conveying apparatus 10 in a case where the second control mode is selected as the gripping plan will be described with reference to FIGS. 26 to 28. The operation plan generation device 80 selects the second control mode as the gripping plan with respect to the article 5b having a columnar shape and a posture in which the upper surface thereof is a curved surface. The operation in the second control mode differs only in the operation of step S10 in FIG. 21. FIG. 26 shows the operation of step S10 in the second control mode. Therefore, as the operation of the conveying apparatus 10 in a case where the second control mode is selected, only the step S10 shown in FIG. 26 will be described.

When the gripping device 30 reaches the gripping preparation posture, the operation plan generation device 80 compares the detection result of the torque sensor 56 of the first finger 51 with a threshold value (step S50 and step S51). When determining that the detection result of the torque sensor 56 of the first finger 51 is smaller than the threshold value (No in step S51), the operation plan generation device 80 drives the driving unit 55a of the first finger 51 as shown in FIG. 27, so as to clamp the article 5b by the clamping mechanism 50 (step S52).

Similarly, the operation plan generation device 80 also compares the detection result of the torque sensor 56 with the threshold value with respect to the second finger 52 and the third finger 53 (steps S53 and S56), if determining that the detection result of the torque sensor 56 is smaller than the threshold value (No in step S54 and No in step S57), the operation plan generation device 80 drives the driving unit 55a as shown in FIG. 28 (step S55 and step S56).

In addition, the operation plan generation device 80 continues to drive the driving unit 55a of the first finger 51, the driving unit 55a of the second finger 52, and the driving unit 55a of the third finger 53 (steps S50 to S60) until determining that the detection results of the torque sensors 56 of all the fingers are equal to or larger than the threshold value (step S59 and No in step S60).

By the operations of steps S50 to S60, by the gripping device 30 bending the first finger 51, the second finger 52, and the third finger 53 as shown in FIGS. 27 and 28, the clamping mechanism 50 clamps the article 5b. As the clamping mechanism 50 clamps the article 5b, the suction portion 41 faces the article 5b.

When the article 5b is clamped by the clamping mechanism 50, the operation plan generation device 80 next opens the valve 44 and activates the vacuum generator 45 (steps S61 and S62). Upon activating the vacuum generator 45, the operation plan generation device 80 compares the pressure sensor 46 with a threshold value (steps S63 and S64). The operation plan generation device 80 drives the vacuum generator 45, and monitors the detection result of the pressure sensor 64 until the detection result of the pressure sensor 64 becomes equal to or larger than the threshold value (No in step S64, step S62, and step S63). When determining that the detection result of the pressure sensor 46 is equal to or larger than the threshold value (Yes in step S64), the operation plan generation device 80 moves the gripping device 30 to the position at the gripping position, and displaces to the posture at the gripping position (step S65), and the process proceeds to step S11.

As described above, since the article 5 can be gripped by the suction by the suction portion 41 and the clamping by the clamping mechanism 50, the gripping device 30 can stably hold the article 5. This point will be explained specifically.

The first finger 51, the second finger 52, and the third finger 53 are rotated with respect to the base portion 31 and displaced in a direction approaching each other, whereby the article 5 is clamped between at least two fingers. Thus, in a case where an article is clamped by rotation of the finger, the article receives a clamping force from the two fingers and receives force acting in a direction to push out from the two fingers. It is assumed a case where the article 5 is detached from the clamping mechanism 50 by the force acting in the direction to push out from between the two fingers.

However, in the present embodiment, the suction force by the suction portion 41 acts in the opposite direction to the direction, described above, of pushing out between the two fingers. Therefore, since the article 5 is sucked by the suction portion 41 in a state where the article 5 is clamped by the clamping mechanism 50, the article 5 is prevented from being pushed out from the clamping mechanism 50. Therefore, the gripping device 30 can stably grip the article 5.

Further, it is possible to stably grip the article 5 by having the first gripping mode Y1, the second gripping mode Y2, and the third gripping mode Y3, as the gripping mode of the article 5 by the gripping device 30, and appropriately selecting the gripping mode from among the first gripping mode Y1, the second gripping mode Y2, and the third gripping mode Y3 according to the shape, the posture, the size, and the position of the article 5.

Furthermore, with respect to the article 5b having a columnar shape and the upper surface 7 thereof being a curved surface, when the gripping device 30 in the gripping preparation posture is displaced to the gripping posture, selection of the second control mode is effective. This point will be explained specifically.

Since the article 5b has a columnar shape, the article easily moves in the container 6. Therefore, it is assumed a case where the position of the article 5b moves after the recognition device 70 measures the position of the article 5b based on the detection result of the article detection device 20. Alternatively, depending on the accuracy of movement of the moving device 60, it is also assumed a case where the suction portion 41 is moved to a position which is shifted from the suctioned portion 4.

Even in such a case, before the negative pressure supplying device 42 is driven, by clamping the articles 5b by the clamping mechanism 50, the article 5b can be guided to a position facing the palm portion 32, that is, a position opposed to the suction portion 41. When the negative pressure supplying device 42 is driven after the article 5b is guided to a position facing the suction portion 41 as described above, the suction portion 41 can suck the article 5b. Similarly, it is effective that with respect to the article 5 which is easy to move, as in the article 5b, the article 5 is operated in the second control mode in the same way.

In the present embodiment, each of the first to third fingers 51, 52, and 53 is an inferior driving system which the second finger configuration portion 54b and the third finger configuration portion 54c are rotated by one driving unit 55a. However, the first to third fingers are not necessarily an inferior driving system. A dedicated driving unit that rotates the second finger configuration portion 54b and a dedicated driving unit that rotates the third finger configuration portion 54c which is separate from the driving unit may be provided. In short, the clamping mechanism 50 may be configured to be capable of clamping the article 5.

In the present embodiment, although the article 5 is placed in the container 6, the way of placing the article 5 is not limited thereto. The article 5 may be placed on a desk or may be conveyed by a conveyor. Alternatively, the article 5 may be stored in a shelf. In addition, the article 5 may be in bulk or in orderly fashion. Alternatively, the article 5 may be placed alone.

In addition, the method of image processing by the recognition device 70 and the criterion (condition) for selecting one article 5 from the plurality of detected articles 5 are not limited to a specific method and a specific criterion or condition. In addition, the article detection device 20 is not limited to a 3D camera, and may be configured by using an RGB camera or other optical sensor, or a plurality of these combinations. In a case of the configuration in which the article detection device 20 uses a 3D camera, it is possible to identify group of the article 5 and recognize the shape, the position, and the posture of the article 5 by processing the obtained point group data.

In addition, in the present embodiment, although the moving device 60 is, for example, a robot arm having 6-axis degree of freedom, the present invention is not limited thereto. The moving device 60 may be a robot arm having 7-axis degree of freedom or a robot arm having 5-axis degree of freedom or less. Alternatively, the moving device 60 may be a scalar robot, an XYZ stage, or the like.

In addition, in the present embodiment, although the moving device 60 is fixed, the moving device may be movable on a linear stage, a self-running cart, or the like.

In addition, in the present embodiment, although each of the fingers 51, 52, and 53 of the clamping mechanism 50 has the driving unit 55*a*, the present invention is not limited thereto. A plurality of fingers may be driven by one driving unit.

In addition, in the present embodiment, although the driving force transmission mechanism 55*b* for driving the finger main body 54 by the driving force of the driving unit 55*a* is, for example, an inferior driving system, the driving force transmission mechanism is not limited thereto. In addition, the driving force transmission mechanism 55*b* may be configured with at least one of, for example, a wire drive, a belt-pulley mechanism, and a gear transmission mechanism.

In addition, in the present embodiment, although the second joint 57*b* of each finger is an inferior driving shaft, the second joint may be a driven shaft with respect to the first joint 57*a*. In addition, a servo motor for driving the finger tip end may be separately provided to randomly control the angle and torque of the second joint 57*b*.

In addition, in the present embodiment, although the driving unit 55*a* is, for example, a servomotor, the driving unit is not limited thereto, and the driving unit may be a DC motor or a brushless DC motor. In addition, although the encoder is also not built in the servo motor, the encoder may be mounted separately.

In addition, each finger may be composed of an artificial muscle bending with air pressure. In this case, the artificial muscle becomes the driving force transmission mechanism 55*b*, and the pump becomes the driving unit 55*a*.

In addition, in the present embodiment, although the suction portion 41 is configured to be expandable and contractible as a bellows-like structure, the suction portion is not limited thereto. In another example, the suction portion 41 may be an opening provided in the surface 33 of the palm portion 32. In addition, a filter may be provided in this opening.

In addition, in the present embodiment, whether or not the article 5 is sucked by the suction portion 41 is detected by the pressure sensor 46. However, it is not limited to using the pressure sensor 46. In another example, a flow rate sensor that measures the flow rate of air in the pipe 47 may be used, or both of the pressure sensor 46 and the flow rate sensor may be used in combination.

In addition, in the present embodiment, one suction portion 41 is provided, but the present invention is not limited thereto. In another example, a plurality of suction portions 41 may be provided. Although the suction portion 41 is provided in the palm portion 32, it is not limited thereto. In another example, in addition to the palm portion 32, the suction portion 41 may be provided at any position of each finger, for example, the second finger configuration portion 54*b* and the first finger configuration portion 54*a*.

In addition, in the present embodiment, the operation plan generation device 80 also functions as a control device for controlling the driving of the gripping device 30. However, the operation plan generation device 80 is not required to control the operation of the gripping device 30. A separate a control device for controlling the operation of the gripping device 30 may be used.

In the present embodiment, although the first gripping mode Y1 is adopted with respect to the article 5 that can be gripped in the first gripping mode Y1, the present invention is not limited to this. For example, even in a case where it is possible to grip in the first gripping mode Y1, the third gripping mode Y3 may be adopted with respect to the article 5 determined to be larger than the predetermined weight.

In addition, the posture of the article 5, which is disposed in the container 6, before being gripped by the gripping device 30 and the posture of the article 5 gripped by the gripping device 30 in the gripping posture may be different from each other. For example, as shown in FIG. 15, after sucking the upper surface of the article 5 placed in the container 6 as a suction surface by the suction portion 41, the surface which is sucked by the suction portion 41 may become the side surface of the article 5 by the posture of the gripping device 30 being displaced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conveying apparatus, comprising:
   an article detection device configured to detect an article and provide information related to shape, posture, and size of the article;
   a gripping device that includes a base portion having a palm portion, a suction portion on the palm portion, a first finger on a first side of the palm portion, a second finger on a second side of the palm portion with the palm portion being between the first and second fingers, each of the first and second fingers having a joint and being moveable toward and away from each other, and a driving mechanism which moves the first and second fingers toward and away from each other;
   a negative pressure supply device to supply a negative pressure to the suction portion;
   a moving device to move the gripping device;
   a recognition device that measures a shape, a posture, and a size of the article based on information from the article detection device;

an operation plan generator device configured to select a suction surface on the article to be suctioned by the suction portion, and set a gripping posture for the gripping device based on measurements by the recognition device, the gripping posture including a posture of the first and second fingers; and a control device configured to control the gripping device and the moving device so as to obtain the gripping posture set by the operation plan generation device, wherein the operation plan generator device:

sets a gripping mode as one mode from an available mode group comprising:
- a first gripping mode in which side surfaces of the article are clamped such that the suction surface of the article is between the side surfaces, and
- a second gripping mode in which one side surface of the article is supported by one of the first or second fingers and a lower end surface of the article is supported by the other of the first and second fingers, selects a region on the suction surface to be suctioned with the suction portion according to the setting of the gripping mode, and selects the gripping posture according to the setting of the gripping mode, selects an upper surface of the article as the suction surface and the first gripping mode when the article has a quadrangular prism shape and a length of a short side of the upper surface of the article is equal to or less than a maximum clamping width of the gripping device, and selects a side surface of the article as the suction surface and the second gripping mode when the article has the quadrangular prism shape and the length of the short side of the upper surface of the article is larger than the maximum clamping width of the gripping device.

2. The conveying apparatus according to claim 1, wherein the operation plan generator device:

selects an upper surface of the article as the suction surface and the first gripping mode when the article has a columnar shape, an upper surface of the article is a flat surface, and an outer diameter of the upper surface of the article is equal to or less than a maximum clamping width of the gripping device, selects a side surface of the article as the suction surface and the second gripping mode when the shape of the article is the columnar shape, the upper surface thereof is the flat surface, and the outer diameter of the upper surface of the article is greater than the maximum clamping width of the gripping device, selects the upper surface of the article as the suction surface and the first gripping mode when the article has a columnar shape, the upper surface thereof is a curved surface, and the outer diameter of an end surface is equal to or less than the maximum clamping width of the gripping device, and selects the side surface of the article as the suction surface and the second gripping mode when the article has the columnar shape, the upper surface thereof is the curved surface, and the outer diameter of an end surface is larger than the maximum clamping width of the gripping device.

3. The conveying apparatus according to claim 1, wherein, when the article is a triangular prism shape having an upper surface including two surfaces which meet at an apex, the operation plan generator device:

sets one surface of two surfaces as the suction surface and selects the first gripping mode when the length of a short side of the one surface of the two surfaces is equal to or less than the maximum clamping width of the gripping device, and sets one surface of the two surfaces as the suction surface and selects the second gripping mode when the length of a short side of each of the two surfaces is larger than the maximum clamping width of the gripping device.

4. The conveying apparatus according to claim 1, wherein, when the article has a plate shape, the operation plan generator device selects a main surface of the article as the suction surface and the second gripping mode.

5. The conveying apparatus according to claim 1, wherein the operation plan generator device selects a gripping preparation posture including a position of the gripping device and a posture of the gripping device, before starting a gripping operation of the article, based on the detection result of the recognition device.

6. The conveying apparatus according to claim 5, wherein the operation plan generator device selects:

a first control mode in which the gripping device suctions the article by driving the negative pressure supply device after the article has been clamped with the fingers, or a second control mode in which the gripping device clamps the article with the fingers after the gripping device begins suctioning the article by driving the negative pressure supply device.

7. A conveying apparatus, comprising:

an article detection device configured to detect an article and provide information related to shape, posture, and size of the article;

a gripping device that includes a base portion having a palm portion, a suction portion on the palm portion, a first finger on a first side of the palm portion, a second finger on a second side of the palm portion with the palm portion being between the first and second fingers, each of the first and second fingers having a joint and being moveable toward and away from each other, and a driving mechanism which moves the first and second fingers toward and away from each other;

a negative pressure supply device to supply a negative pressure to the suction portion;

a moving device to move the gripping device;

a recognition device that measures a shape, a posture, and a size of the article based on information from the article detection device;

an operation plan generator device configured to select a suction surface on the article to be suctioned by the suction portion, and set a gripping posture for the gripping device based on measurements by the recognition device, the gripping posture including a posture of the first and second fingers; and a control device configured to control the gripping device and the moving device so as to obtain the gripping posture set by the operation plan generation device, wherein the operation plan generator device:

sets a gripping mode as one mode from an available mode group comprising:
- a first gripping mode in which side surfaces of the article are clamped such that the suction surface of the article is between the side surfaces, and
- a second gripping mode in which one side surface of the article is supported by one of the first or second fingers and a lower end surface of the article is supported by the other of the first and second fingers, selects a region on the suction surface to be suctioned with the suction portion according to the setting of the gripping mode, and selects the gripping posture according to the setting of the gripping mode, and the gripping device comprises:

a second finger supporting mechanism that supports the second finger on the base portion, the second finger supporting mechanism being movable between the second side and the first side;

a third finger on the palm portion; and a third finger supporting mechanism that supports the third finger on the base portion, the third finger supporting mechanism being movable between the second side and the first side, and the first, second, and third fingers can be arranged according to one of:

a first arrangement mode in which the second finger and the third finger are on the second side, a second arrangement mode in which the first finger, the second finger, and the third finger are on the first side, a third arrangement mode in which the second finger and the third finger face each other and the palm portion is therebetween, and a fourth arrangement mode in which the first finger, the second finger, and the third finger are at equal intervals around an outer circumference of the palm portion, the available mode group further includes:

a third gripping mode for supporting a lower end of the article when the fingers are in the second arrangement mode.

8. The conveying apparatus according to claim 7, wherein the operation plan generator device:

selects an upper surface of the article as the suction surface, the first gripping mode, and the first or third arrangement mode when the article has a quadrangular prism shape, and a length of a short side of the upper surface of the article is equal to or less than the maximum clamping width of the gripping device, and selects a side surface of the article as the suction surface and one of:

the second gripping mode and the first arrangement mode, or the third gripping mode and the second arrangement mode when the article has the quadrangular prism shape and the length of the short side of the upper surface of the article is greater than the maximum clamping width of the gripping device.

9. The conveying apparatus according to claim 7, wherein the operation plan generator device:

selects an upper surface of the article as the suction surface, the first gripping mode, and one of the first arrangement mode or the third arrangement mode when the article is a columnar shape, the upper surface thereof is a flat surface, and the outer diameter of the upper surface is equal to or less than the maximum clamping width of the gripping device, selects a side surface of the article as the suction surface, and one of the following:

the second gripping mode and the first arrangement mode, and the third gripping mode and the second arrangement mode when the article has a columnar shape, the upper surface thereof is flat, and the outer diameter of the upper surface is larger than the maximum clamping width of the gripping device.

10. The conveying apparatus according to claim 7, wherein the operation plan generator device:

when the article has a triangular prism shape with the upper surface thereof having one surface on which the gripping device can clamp when in the fourth arrangement mode, selects an upper surface of the article as the suction surface, the first gripping mode, and the fourth arrangement mode, when the article has the triangular prism shape, the upper surface thereof includes two surfaces, and a length of a short side of at least one of the two surfaces is equal to or less than a maximum clamping width of the gripping device, selects at least one of two surface of the article as the suction surface, the first gripping mode, and the first or second arrangement mode, and when the article has a triangular prism shape, the upper surface thereof is configured with the two surfaces, and the length of each short side of the two surfaces is larger than a maximum clamping width of the gripping device, selects at least one of two surfaces of the article as the suction surface, and one of the following:

the second gripping mode and the first arrangement mode, or the third gripping mode and the second arrangement mode.

11. The conveying apparatus according to claim 7, wherein, when the article has a plate shape, the operation plan generator device selects a main surface of the plate shape as the suction surface, the second gripping mode, and the first arrangement mode.

12. The conveying apparatus according to claim 7, wherein the operation plan generator device selects a gripping preparation posture including a position of the gripping device and a posture of the gripping device, before starting a gripping operation of the article, based on the detection result of the recognition device.

13. The conveying apparatus according to claim 12, wherein the operation plan generator device selects:

a first control mode in which the gripping device suctions the article by driving the negative pressure supply device after the article has been clamped with the fingers, or a second control mode in which the gripping device clamps the article with the fingers after the gripping device begins suctioning the article by driving the negative pressure supply device.

14. A conveying apparatus, comprising:

an article detection device configured to detect an article and provide information related to shape, posture, and size of the article;

a gripping device that includes a base portion having a palm portion, a suction portion on the palm portion, a first finger on a first side of the palm portion, a second finger on a second side of the palm portion with the palm portion being between the first and second fingers, each of the first and second fingers having a joint and being moveable toward and away from each other, and a driving mechanism which moves the first and second fingers toward and away from each other;

a negative pressure supply device to supply a negative pressure to the suction portion;

a moving device to move the gripping device;

a recognition device that measures a shape, a posture, and a size of the article based on information from the article detection device;

an operation plan generator device configured to select a suction surface on the article to be suctioned by the suction portion, and set a gripping posture for the gripping device based on measurements by the recognition device, the gripping posture including a posture of the first and second fingers; and a control device configured to control the gripping device and the moving device so as to obtain the gripping posture set by the operation plan generation device, wherein the operation plan generator device:

sets a gripping mode as one mode from an available mode group comprising:
- a first gripping mode in which side surfaces of the article are clamped such that the suction surface of the article is between the side surfaces, and
- a second gripping mode in which one side surface of the article is supported by one of the first or second fingers and a lower end surface of the article is supported by the other of the first and second fingers, selects a region on the suction surface to be suctioned with the suction portion according to the setting of the gripping mode, and selects the gripping posture according to the setting of the gripping mode; and wherein, when the article has a plate shape, the operation plan generator device selects a main surface of the article as the suction surface and the second gripping mode.

15. The conveying apparatus according to claim 14, wherein the operation plan generator device:

selects an upper surface of the article as the suction surface and the first gripping mode when the article has a columnar shape, an upper surface of the article is a flat surface, and an outer diameter of the upper surface is equal to or less than a maximum clamping width of the gripping device, selects a side surface of the article as the suction surface and the second gripping mode when the shape of the article is the columnar shape, the upper surface thereof is the flat surface, and the outer diameter of the upper surface is greater than the maximum clamping width of the gripping device, selects the upper surface of the article as the suction surface and the first gripping mode when the article has a columnar shape, the upper surface thereof is a curved surface, and the outer diameter of an end surface is equal to or less than the maximum clamping width of the gripping device, and selects the side surface of the article as the suction surface and the second gripping mode when the article has the columnar shape, the upper surface thereof is the curved surface, and the outer diameter of an end surface is larger than the maximum clamping width of the gripping device.

16. The conveying apparatus according to claim 14, wherein, when the article is a triangular prism shape having an upper surface including two surfaces which meet at an apex, the operation plan generator device:

sets one surface of two surfaces as the suction surface and selects the first gripping mode when the length of a short side of the one surface of the two surfaces is equal to or less than the maximum clamping width of the gripping device, and sets one surface of the two surfaces as the suction surface and selects the second gripping mode when the length of a short side of each of the two surfaces is larger than the maximum clamping width of the gripping device.

17. The conveying apparatus according to claim 14, wherein the operation plan generator device selects a gripping preparation posture including a position of the gripping device and a posture of the gripping device, before starting a gripping operation of the article, based on the detection result of the recognition device.

18. The conveying apparatus according to claim 17, wherein the operation plan generator device selects:

a first control mode in which the gripping device suctions the article by driving the negative pressure supply device after the article has been clamped with the fingers, or a second control mode in which the gripping device clamps the article with the fingers after the gripping device begins suctioning the article by driving the negative pressure supply device.

* * * * *